(12) United States Patent
Goto et al.

(10) Patent No.: US 11,005,601 B2
(45) Date of Patent: May 11, 2021

(54) TRANSMISSION DEVICE, RECEPTION DEVICE, AND COMMUNICATION METHOD

(71) Applicants: SHARP KABUSHIKI KAISHA, Sakai (JP); FG INNOVATION COMPANY LIMITED, Tuen Mun (HK)

(72) Inventors: Jungo Goto, Sakai (JP); Osamu Nakamura, Sakai (JP); Takashi Yoshimoto, Sakai (JP); Yasuhiro Hamaguchi, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 234 days.

(21) Appl. No.: 16/090,244

(22) PCT Filed: Feb. 22, 2017

(86) PCT No.: PCT/JP2017/006488
§ 371 (c)(1),
(2) Date: Sep. 29, 2018

(87) PCT Pub. No.: WO2017/183281
PCT Pub. Date: Oct. 26, 2017

(65) Prior Publication Data
US 2019/0116004 A1    Apr. 18, 2019

(30) Foreign Application Priority Data

Apr. 19, 2016    (JP) .............................. JP2016-083426

(51) Int. Cl.
*H04L 1/18* (2006.01)
*H04L 5/00* (2006.01)
(Continued)

(52) U.S. Cl.
CPC .............. *H04L 1/18* (2013.01); *H04L 1/0061* (2013.01); *H04L 1/16* (2013.01); *H04L 5/0048* (2013.01);
(Continued)

(58) Field of Classification Search
CPC ....... H04L 1/18; H04L 5/0055; H04L 1/0061; H04L 5/0048; H04L 5/001;
(Continued)

(56) References Cited

U.S. PATENT DOCUMENTS 10,708,015 B2 *   7/2020  Kim ................... H04W 72/1278
2010/0322080 A1 * 12/2010  Sung ..................... H04L 5/0007
370/242

(Continued)

OTHER PUBLICATIONS

Ericsson, Random access for Rel-13 low complexity and enhanced coverage UEs, 3GPP TSG-RAN WG2 #91 R2-153717, Aug. 14, 2015 (Year: 2015).*

(Continued)

*Primary Examiner* — Walli Z Butt
*Assistant Examiner* — Thad N Defauw
(74) *Attorney, Agent, or Firm* — ScienBiziP, P.C.

(57) ABSTRACT

In a case of a contention-based radio communication technique, it is necessary to identify a terminal apparatus that has performed data transmission among terminal apparatuses sharing frequency resources. There is a problem that it is difficult to identify the terminal apparatus that has performed data transmission in a case with a large number of terminal apparatuses that are non-orthogonally spatial multiplexed. Provided is a transmission device for transmitting a data signal to a reception device, the transmission device including: a transmission processing unit configured to transmit the data signal without performing SR transmission or receiving control information of transmission permission transmitted from the reception device; an identification (Continued)

signal multiplexing unit configured to multiplex an identification signal to an orthogonal resource; and a control information receiving unit configured to receive in advance a transmission parameter relating to transmission of the data signal. The transmission processing unit transmits the identification signal and a data signal in a case that the transmission processing unit repeatedly transmits the same data signal, based on the transmission parameter.

12 Claims, 22 Drawing Sheets

(51) Int. Cl.
    *H04L 1/00*     (2006.01)
    *H04L 27/26*     (2006.01)
    *H04W 72/04*     (2009.01)
    *H04W 74/08*     (2009.01)
    *H04W 72/14*     (2009.01)
    *H04W 4/70*     (2018.01)
    *H04L 1/16*     (2006.01)

(52) U.S. Cl.
    CPC ........ *H04L 5/0055* (2013.01); *H04L 27/2602* (2013.01); *H04L 27/2607* (2013.01); *H04W 4/70* (2018.02); *H04W 72/0446* (2013.01); *H04W 72/14* (2013.01); *H04W 74/08* (2013.01); *H04L 1/1854* (2013.01); *H04L 1/1887* (2013.01); *H04L 5/001* (2013.01)

(58) Field of Classification Search
    CPC ................ H04L 27/2607; H04W 4/70; H04W 72/0446; H04W 74/08; H04W 72/14
    See application file for complete search history.

(56) References Cited

U.S. PATENT DOCUMENTS

| | | | |
|---|---|---|---|
| 2011/0134968 A1* | 6/2011 | Han | H04L 5/0023 375/146 |
| 2011/0176500 A1* | 7/2011 | Wager | H04W 74/0833 370/329 |
| 2016/0150560 A1* | 5/2016 | Ji | H04L 1/1861 370/330 |
| 2019/0110288 A1* | 4/2019 | Yamamoto | H04W 72/04 |

OTHER PUBLICATIONS

3GPP, TS 22.368 V11.6.0, "Service requirements for Machine-Type communications(MTC)", Sep. 2012.

* cited by examiner

TRANSMISSION DEVICE, RECEPTION DEVICE, AND COMMUNICATION METHOD

TECHNICAL FIELD

The present invention relates to a transmission device, a reception device, and a communication method.

BACKGROUND ART

In recent years, the Fifth Generation mobile telecommunication systems (5G) has been attracting attention, and standardization of communication technologies to enable Massive Machine Type Communications (mMTC) mainly by a number of terminal apparatuses, Ultra-reliable and low latency communications, and Enhanced mobile broadband is expected. In particular, future implementation of the Internet of Things (IoT) in various apparatuses is expected, and one of key elements of 5G is implementation of mMTC.

For example, in the 3rd Generation Partnership Project (3GPP), a Machine-to-Machine (M2M) communication technique has been standardized as Machine Type Communication (MTC), in which terminal apparatuses performing small-sized data transmission and/or reception are accommodated (NPL 1). Moreover, standardization of Narrow Band-IoT (NB-IoT) is also being advanced to support low-rate data transmission in a narrow band.

In the Long Term Evolution (LTE), the LTE-Advanced, the LTE-Advanced Pro, and the like, that have been standardized by the 3GPP, a terminal apparatus transmits Scheduling Request (SR) upon occurrence of traffic of transmission data, and, after reception of control information of transmission permission (UL Grant) from a base station apparatus, and performs the data transmission using a transmission parameter in the control information included in the UL Grant, at prescribed timing. A radio communication technique in which a base station apparatus performs radio resource control of all uplink data transmissions (data transmissions from terminal apparatuses to the base station apparatus) as described above has been implemented. With this technique, the base station apparatus enables Orthogonal Multiple Access (OMA) using radio resource control, which makes it possible to perform uplink data reception by simple reception processing.

However, in such a known radio communication technique, since the base station apparatus performs the entire radio resource control, transmission and/or reception of control information is needed before data transmission irrespective of the amount of data to be transmitted from a terminal apparatus. This in particular leads to a relative increase of the proportion of control information with a decrease in size of data to transmit. In a case that a terminal performs transmission of small-sized data, it is effective, from the viewpoint of overhead relating to control information, to use a contention-based (Grant Free) radio communication technique, in which a terminal apparatus performs data transmission without SR transmission and reception of any UL Grant transmitted from a base station apparatus. Moreover, in such a contention-based radio communication technique, time from data occurrence to data transmission can be reduced.

CITATION LIST

Non Patent Literature

NPL 1: 3GPP, TS22.368 V1.6.0, "Service requirements for Machine-Type communications (MTC)", September 2012

SUMMARY OF INVENTION

Technical Problem

However, in a case that a number of terminal apparatuses perform uplink data transmission using the contention-based radio communication technique, it is assumed that multiple terminal apparatuses share a frequency resource, and this leads to a problem that data signals of the multiple terminal apparatuses collide with each other at the same time and the same frequency. Even in a case that data signals collide with each other at the same time and the same frequency, and data from terminal apparatuses the number of which is greater than the number of receive antennas of a base station is non-orthogonally spatial multiplexed, transmission data signals can be detected by the base station apparatus applying turbo equalization, Successive Interference Canceller (SIC), or Symbol Level Interference Canceller (SLIC) to reception processing. In a case of the contention-based radio communication technique, however, it is necessary to identify a terminal apparatus that has performed data transmission among terminal apparatuses sharing a frequency resource. In particular, there is a problem that it is difficult to identify a terminal apparatus that has performed data transmission in a case with a large number of terminal apparatuses that are non-orthogonally spatial multiplexed.

The present invention has been made in view of the above-described respects, and is to provide a communication method that enables a base station apparatus to identify a terminal apparatus that has performed data transmission in a case that a number of terminal apparatuses perform uplink data transmission using a contention-based radio communication technique.

Solution to Problem (1) The present invention has been made to solve the above-described problems, and an aspect of the present invention is a transmission device for transmitting a data signal to a reception device, the transmission device including: a transmission processing unit configured to transmit the data signal without receiving control information of transmission permission transmitted from the reception device; an identification signal multiplexing unit configured to multiplex an identification signal to an orthogonal resource; and a control information receiving unit configured to receive in advance a transmission parameter relating to transmission of the data signal. The transmission processing unit transmits the identification signal and a data signal in a case that the transmission processing unit repeatedly transmits the same data, based on the transmission parameter.

(2) In the aspect of the present invention, in a case that the transmission processing unit repeatedly transmits the same data, the orthogonal resource to which the identification signal is multiplexed, is selected to be an orthogonal resource different for the each data transmission.

(3) In the aspect of the present invention, the orthogonal resource to which the identification signal is multiplexed is determined based on the number of times the same data is transmitted.

(4) In the aspect of the present invention, the orthogonal resource to which the identification signal is multiplexed is determined based on a subframe number of a subframe in which the same data is transmitted.

(5) In the aspect of the present invention, the orthogonal resource includes at least one of an OFDM symbol, a subcarrier, an OCC sequence, a CS pattern, and an IFDMA pattern.

(6) In the aspect of the present invention, the transmission parameter relating to the data transmission includes a degree of reliability of the data transmission that the transmission device is required to have or the number of times the same data is transmitted, the number of times being configured according to delay time.

(7) An aspect of the present invention is a reception device for receiving a data signal from each of multiple transmission devices, the reception device including: a reception processing unit configured to perform first data reception of receiving the data signal transmitted without transmitting control information of transmission permission and second data reception of transmitting the control information of the transmission permission and receiving the data signal transmitted based on the control information; an identification signal separator configured to separate, from an orthogonal resource, an identification signal received together with the data; a transmission terminal identification unit configured to identify, based on the identification signal, the transmission device that has performed data transmission; and a control information transmitting unit configured to transmit in advance a transmission parameter to be used for the data transmission. The reception processing unit receives the identification signal and a data signal in a case of receiving, in the first data reception, the same data repeatedly transmitted based on the transmission parameter.

(8) In the aspect of the present invention, in a case that the reception processing unit receives the same data repeatedly transmitted from the transmission device, the transmission terminal identification unit identifies the transmission device, based on the identification signal multiplexed to the orthogonal resource different for the each data reception.

(9) In the aspect of the present invention, ACK/NACK is transmitted in the second data reception while ACK/NACK is not transmitted in the first data reception.

(10) In the aspect of the present invention, the reception device includes a signal detection unit configured to detect the data signal transmitted from the transmission device. In the first data reception, ACK/NACK is transmitted within a prescribed time from a subframe in which the signal detection unit correctly receives the data signal while the same data repeatedly transmitted is received.

(11) An aspect of the present invention is a communication method for a transmission device for transmitting a data signal to a reception device, the communication method including: a transmission step of transmitting the data signal without receiving control information of transmission permission transmitted from the reception device; a multiplexing step of multiplexing an identification signal to an orthogonal resource; and a reception step of receiving in advance a transmission parameter relating to transmission of the data signal. In the transmission step, the identification signal and a data signal are transmitted in a case of repeatedly transmitting the same data, based on the transmission parameter.

(12) An aspect of the present invention is a communication method for a reception device for receiving a data signal from each of multiple transmission devices, the communication method including: a reception step capable of performing first data reception of receiving the data signal transmitted without transmitting control information of transmission permission and second data reception of transmitting the control information of the transmission permission and receiving the data signal transmitted based on the control information; an identification signal separation step of separating, from an orthogonal resource, an identification signal received together with the data; a transmission terminal identification step of identifying, based on the identification signal, the transmission device that has performed data transmission; and a control information transmission step of transmitting in advance a transmission parameter to be used for the data transmission. In the reception step, the identification signal and a data signal are received in a case of receiving, in the first data reception, the same data repeatedly transmitted based on the transmission parameter.

Advantageous Effects of Invention

According to the present invention, a base station apparatus can identify a terminal apparatus that has performed data transmission, in a case that a number of terminal apparatuses perform uplink data transmission using a contention-based radio communication technique. As a result of this, the base station apparatus can accommodate a number of terminal apparatuses and reduce the amount of control information.

DESCRIPTION OF EMBODIMENTS

Hereinafter, embodiments will be described with reference to the drawings. In each embodiment below, a description will be given by assuming, based on Machine-to-Machine Communication (M2M communication) (also referred to as Machine Type Communication (MTC), communication for Internet of Things (IoT), and Narrow Band-IoT (NB-IoT)), that a transmission device is a MTC terminal (referred to as a terminal apparatus below) and a reception device is a base station apparatus. Note that, however, the disclosure is not limited to the above example and is also applicable to uplink transmission in a cellular system. In this case, a terminal apparatus configured to perform data transmission involving human is a transmission device, and a base station apparatus is a reception device. Furthermore, it is also applicable to downlink transmission in a cellular system. In this case, transmission and reception devices in data transmission are reversed to those in uplink transmission. In addition, it is also applicable to Device-to-Device (D2D) communication. In this case, both a transmission device and a reception device are terminal apparatuses.

Figure 1:
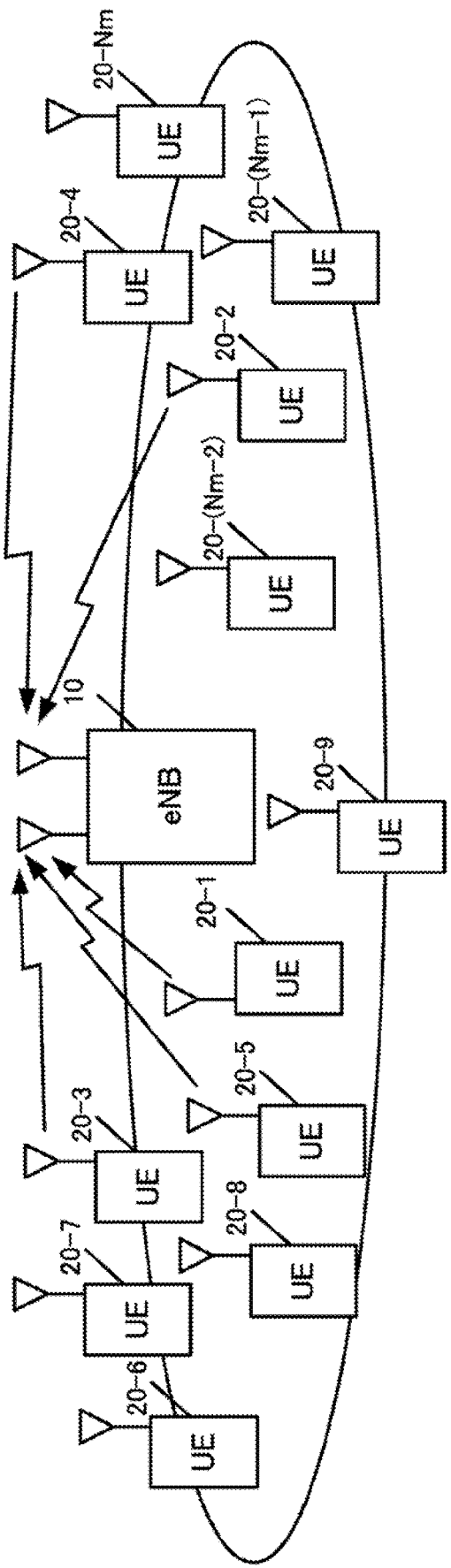
FIG. 1 is a diagram illustrating an example of a configuration of a system according to a present embodiment.

FIG. 1 illustrates an example of a configuration of a system according to the present embodiment. The system includes a base station apparatus 10 and terminal apparatuses 20-1 to 20-Nm. Note that the number of terminal apparatuses (terminals, mobile terminals, mobile stations, or User Equipment (UE)) is not limited to any, and the number of antennas of each apparatus may be one or multiple. The base station apparatus 10 may perform communication using a so-called licensed band with a license issued from a country or a region for providing services by a radio operator, or may perform communication using a so-called unlicensed band requiring no license from the country or the region. The base station apparatus 10 may be a macro base station apparatus with a large coverage or a small-cell base station or a pico base station apparatus (also referred to as a Pico evolved Node B (eNB), Small cell, Low Power Node, or a Remote Radio Head) with a coverage smaller than that of the macro base station apparatus. Each frequency band other than a licensed band is not limited to the example of an unlicensed band herein and may alternatively be a white band (white space) or the like. The base station apparatus 10 may employ a Carrier Aggregation (CA) technique using multiple Component Carriers (CCs) (also referred to as Serving cells) in a band used in LTE communication, or may perform data transmission on different CCs or may perform data transmission on the same CC for MTC and communication different from MTC. As an example of employing CA, communication different from MTC may be assumed to use a Primary cell (PCell), and MTC communication may be assumed to use a Secondary cell (SCell). Alternatively, different subcarriers may be used for MTC and communication different from MTC in the same CC.

The terminal apparatuses 20-1 to 20-Nm is assumed to be able to transmit data in MTC to the base station apparatus 10. Each of the terminal apparatuses 20-1 to 20-Nm receives, at the time when the terminal apparatus has established a connection with a base station, control information necessary for data transmission from the base station apparatus 10 or another base station apparatus in advance. After occurrence of data to transmit (traffic), a corresponding one of the terminal apparatuses 20-1 to 20-Nm performs data transmission by using a radio communication technique (also referred to as a contention-based radio communication technique, Grant free access, Grant free communication. Grant free data transmission, or the like) having no need of Scheduling Request (SR) transmission or reception of transmission permission control information (UL Grant) transmitted from the base station apparatus. However, in a case that a radio communication technique (also referred to as a non-contention-based radio communication technique, Grant-based access, Grant-based communication, Grant-based data transmission, or the like; hereinafter referred to as a non-contention-based radio communication technique), such as the Long Term Evolution (LTE), the LTE-Advanced, or the LTE-Advanced Pro, which requires SR transmission and/or UL Grant reception, can also be used, each of the terminal apparatuses 20-1 to 20-Nm may switch the contention-based radio communication technique and the non-contention-based radio communication technique according to transmission data, data size, Quality of Service (QoS) of the transmission data, and/or the like, to use a corresponding radio communication technique. In other words, each of the terminal apparatuses 20-1 to 20-Nm may determine whether to perform data transmission using a radio resource scheduled by the base station apparatus through SR transmission before the data transmission or to perform data transmission by using at least part of a radio resource prescribed before the occurrence of data. The QoS may include the reliability of data transmission, delay time for data transmission, or communication rate, and may also include an indicator for power consumption relating to data transmission of the terminal apparatus (e.g., power per bit in the data transmission) or the like. Here, the terminal apparatuses 20-1 to 20-Nm are not limited only to MTC but may also be capable of Human-to-Machine (H2M) Communication and/or Human-to-Human (H2H) Communication involving human, or the like. In these cases, the base station apparatus 10 may transmit UL Grant, which is control information including a transmission parameter to be used for data transmission on a Physical Downlink Control CHannel (PDCCH), an Enhanced PDCCH (EPDCCH), or a physical channel on which another downlink control information is transmitted, through dynamic scheduling or Semi-Persistent Scheduling (SPS) depending on data type. The corresponding one of the terminal apparatuses 20-1 to 20-Nm performs data transmission, based on the transmission parameter in the UL Grant.

First Embodiment

Figure 2:
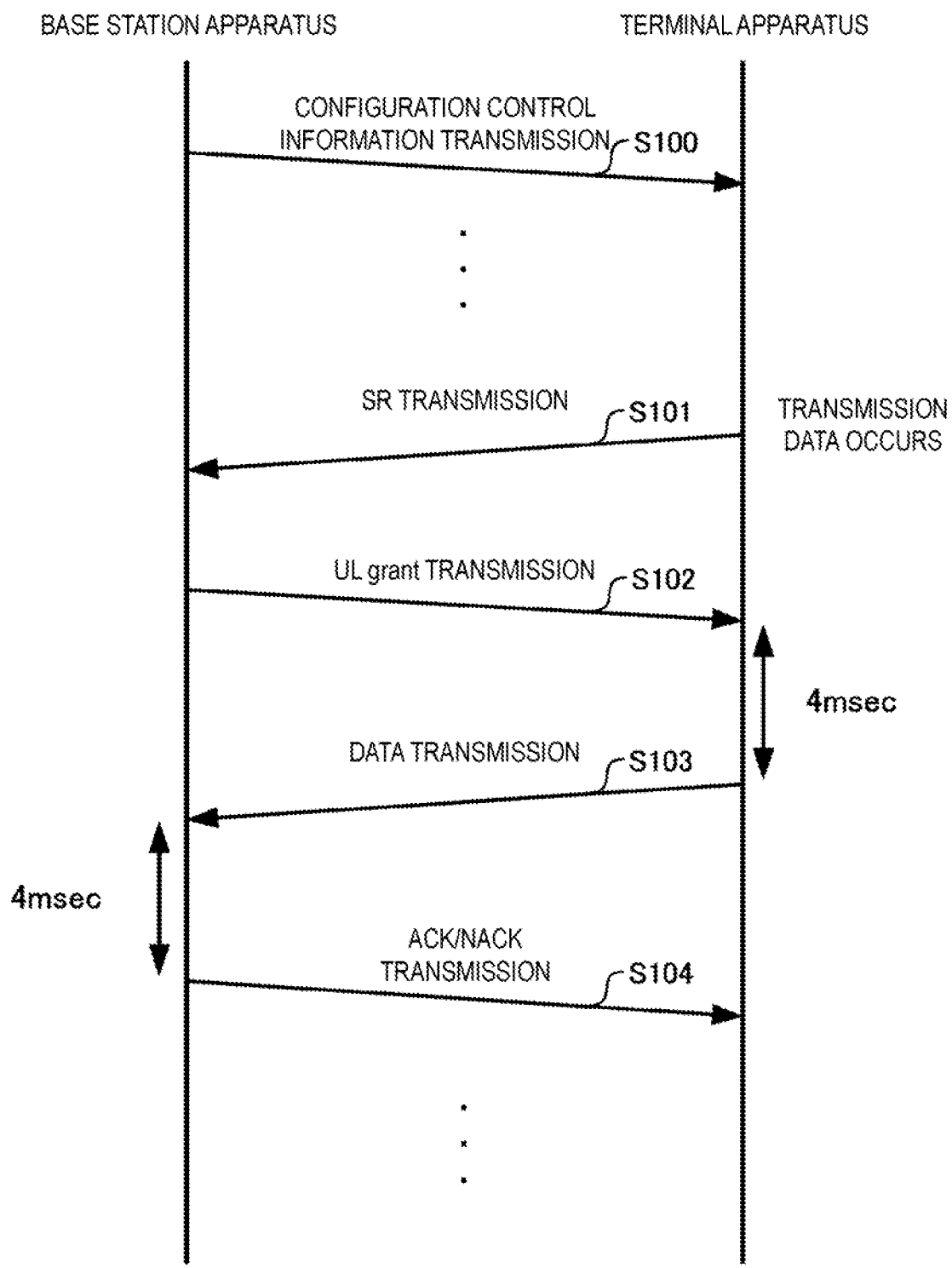
FIG. 2 is a diagram illustrating an example of a sequence chart of data transmission by a terminal apparatus according to a known radio communication technique.

FIG. 2 illustrates an example of a sequence chart of data transmission by a terminal apparatus according to a known radio communication technique. The base station apparatus transmits configuration control information upon establishment of a connection with a terminal apparatus (S100). The configuration control information may be notified through Radio Resource Control (RRC) or may be higher layer control information, such as System Information Block (SIB) or a DCI format. A physical channel to be used is a PDCCH, an EPDCCH, or a Physical Downlink Shared CHannel (PDSCH) or another physical channel may be used. In a case that the terminal apparatus has not received any UL Grant at the time when uplink data occurs, the terminal apparatus transmits SR to request an UL Grant (S101). After receiving the SR, the base station apparatus transmits an UL Grant to the terminal apparatus on the PDCCH or the EPDCCH (S102). In a case of Frequency Division Duplex (FDD; also referred to as frame structure type 1), the terminal apparatus performs data transmission based on the transmission parameter included in the UL Grant, in the subframe that is 4 msec after the subframe in which the UL Grant is detected through blind decoding on the PDCCH or the EPDCCH (S103). Note that although the interval is not limited to 4 msec in a case of Time Division Duplex (TDD; also referred to as frame structure type 2), the description is given based on FDD to make explanation simple. The base station apparatus detects data transmitted from the terminal apparatus and transmits ACK/NACK indicating whether the data detected in the subframe that is 4 msec after the subframe in which the data signal has been received involves any error (S104). Here, in S101, in a case that no SR transmission resource is notified through RRC, the terminal apparatus requests UL Grant by using a Physical Random Access CHannel (PRACH). Moreover, it is assumed that, in S102, data transmission of only one subframe is possible in a case of dynamic scheduling; periodic data transmission is allowed in a case of SPS and information, such as SPS period, is notified through RRC in S100. The terminal apparatus stores the transmission parameter, such as SR transmission resource, the SPS period, and/or the like notified from the base station apparatus through the RRC.

Figure 3:
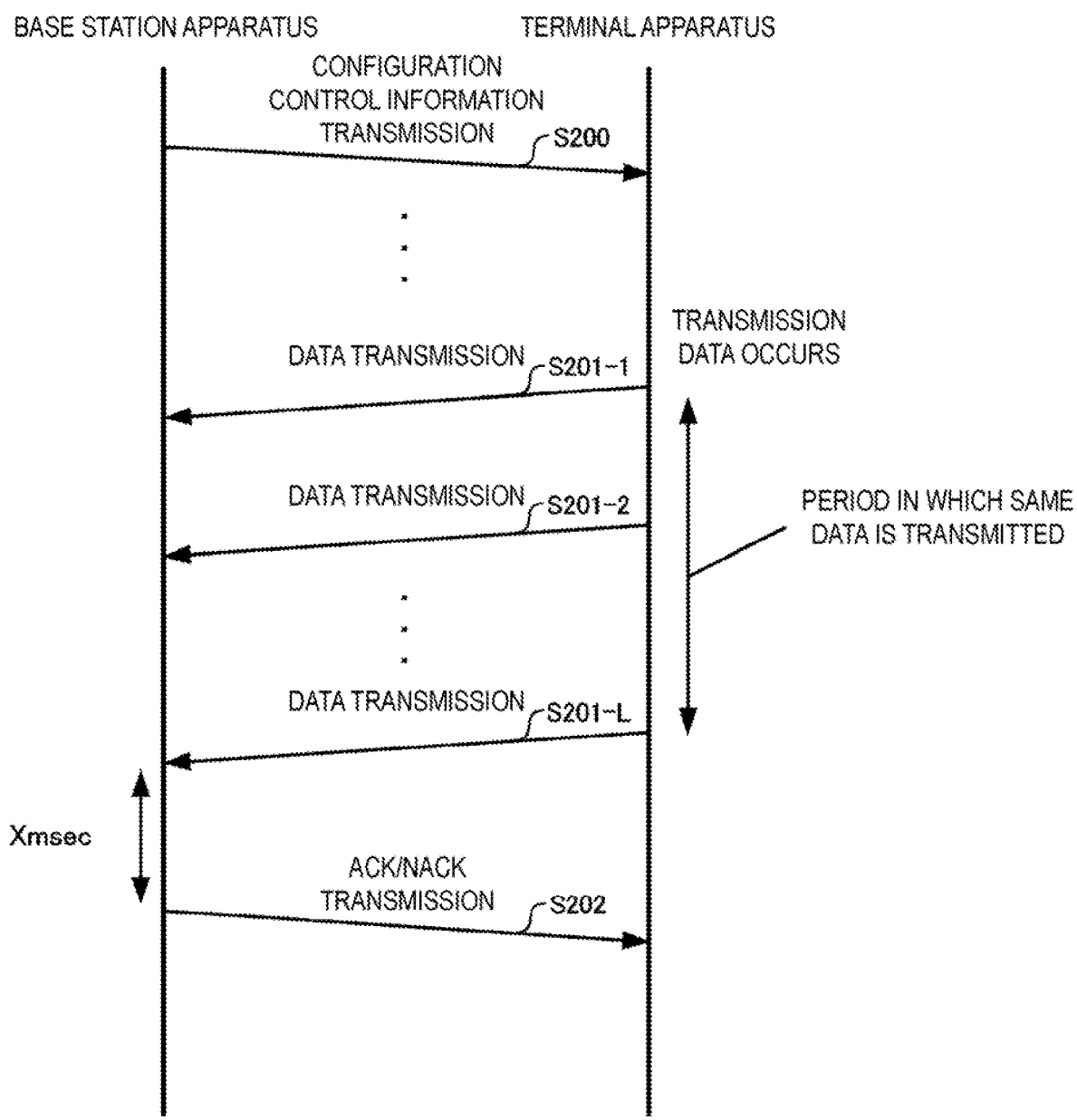
FIG. 3 is a diagram illustrating an example of a sequence chart of data transmission by a terminal apparatus according to a radio communication technique of the present embodiment.

FIG. 3 illustrates an example of a sequence chart of data transmission by a terminal apparatus according to a radio communication technique of the present embodiment. First, the base station apparatus transmits configuration control information upon establishment of a connection with a terminal apparatus (S200). The configuration control information may be notified through RRC, or may be higher layer control information, such as SIB or a DCI format. A physical channel to be used may be the PDCCH, the EPDCCH, or the PDSCH, or may use another physical channel. The configuration control information includes radio resources, transmission parameters, and the like to be used in a contention-based radio communication technique. In a case that the terminal apparatus can also use a non-contention-based radio communication technique, such as the LTE, the LTE-Advanced, and/or the LTE-Advanced Pro, the configuration control information may also include control information notified in S100 in FIG. 2. In a case that the terminal apparatus has received the control information in S200 upon occurrence of uplink data, the terminal apparatus transmits the data by using the contention-based radio communication technique, which does not require SR transmission and reception of UL Grant transmitted from the base station apparatus (S201-1). Here, the terminal apparatus has been notified, in S200, of the number of transmissions, the transmission period, and/or the transmission period of the same data, a radio resource to be used for the transmission, a transmission parameter, and/or the like, according to the required QoS (reliability of the data transmission, delay time of the data transmission, and/or the communication rate may also be included), and transmits data similar to that in S201-1, based on the control information received in S200 (S201-2 to S201-L). Note that, however, the present invention is not limited to a case of transmitting the same data multiple times, and data may be transmitted only once by setting L=1. The base station apparatus detects data transmitted from the terminal apparatus and transmits ACK/NACK indicating whether or not the data detected in the subframe that is X msec after the subframe in which the data signal has been received involves any error (S202). X may be set at X=4 from data transmission as in the known FDD or may take a different value. Although the last data transmission (S201-L) is used as a reference in FIG. 3, the reference is not limited to this example. For example, a subframe in which the base station apparatus has successfully detected data without any error may be used as a reference, and the transmission may be performed in the subframe X msec after this subframe. In the contention-based radio communication technique, ACK/NACK may not necessarily be transmitted, and the base station may switch whether or not to transmit ACK/NACK depending on used technique among the non-contention-based and contention-based radio communication technique.

Figure 4:
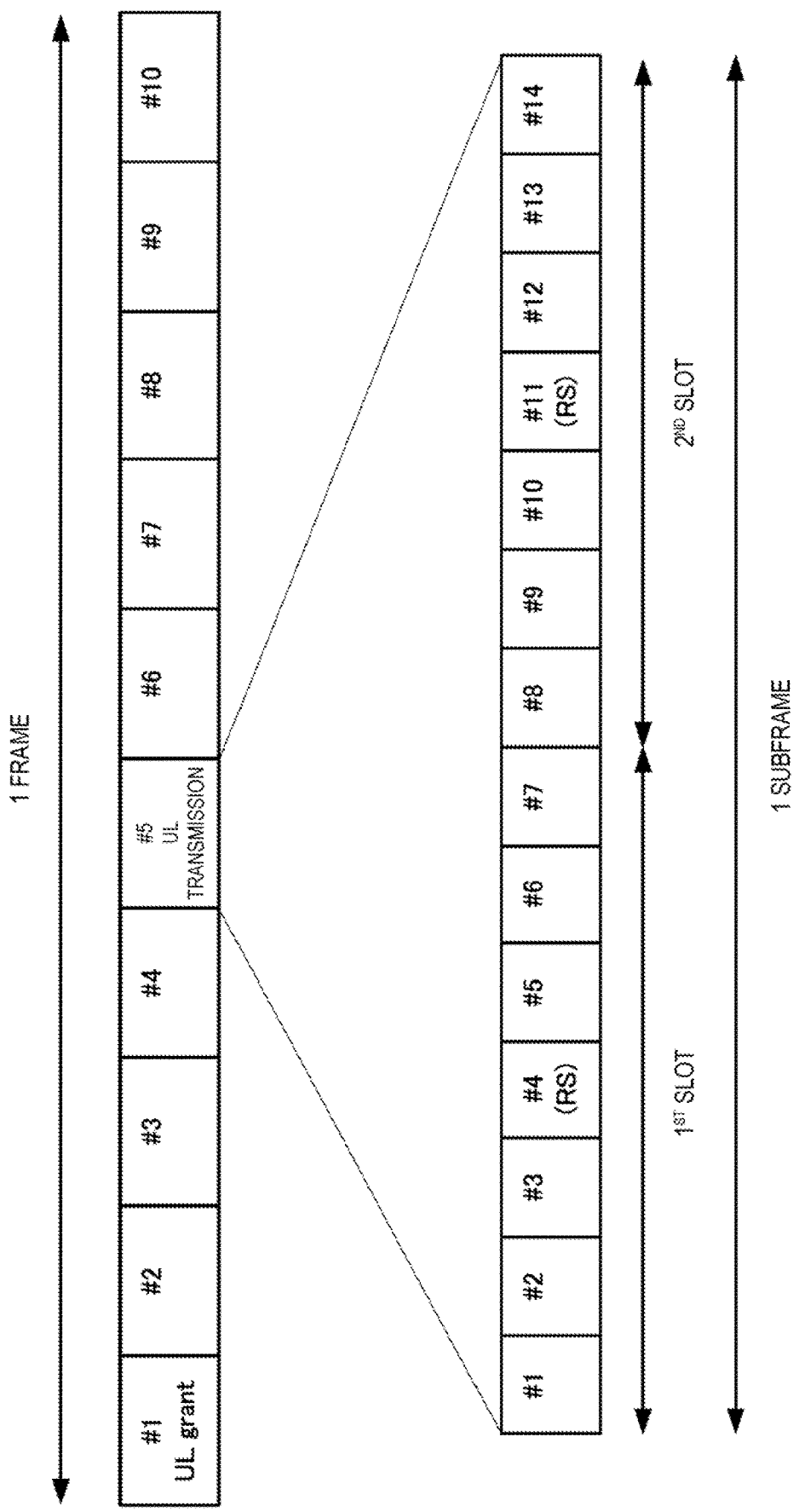
FIG. 4 is a diagram illustrating an example of an uplink frame structure according to the known radio communication technique.
Figure 5:
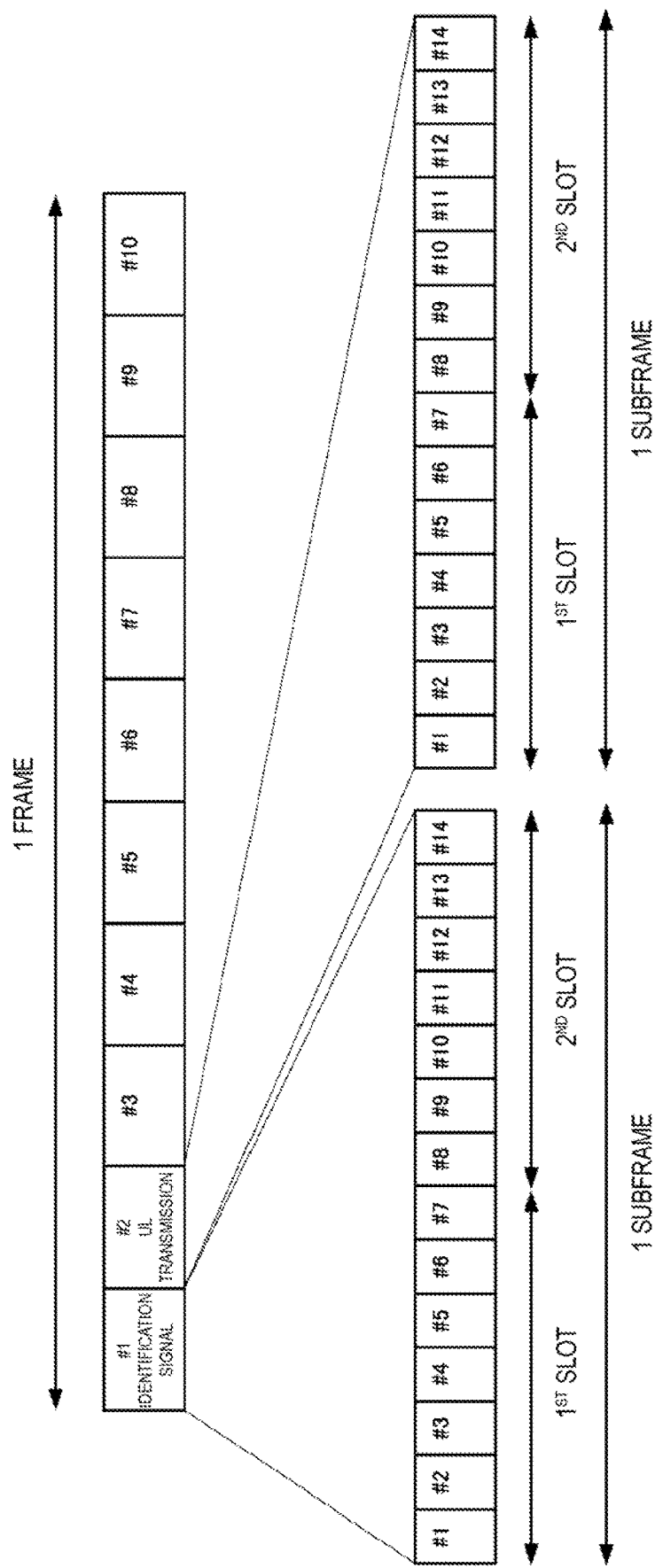
FIG. 5 is a diagram illustrating an example of an uplink frame structure according to the radio communication technique of the present embodiment.

FIG. 4 illustrates an example of an uplink frame structure according to the known radio communication technique. In the known uplink frame structure, one frame is 10 msec and is configured of 10 subframes, one subframe is configured of two slots, and one slot is configured of seven OFDM symbols. A De-Modulation Reference Signal (DMRS) is mapped to the OFDM symbol in the middle of each slot, that is, OFDM symbol #4 in a case that there are OFDM symbols #1 to #7. Moreover, in the known technique, in a case that the terminal apparatus receives UL Grant in subframe #1, data transmission is possible in subframe #5, which is 4 msec after subframe #1. FIG. 5 illustrates an example of an uplink frame structure according to the radio communication technique of the present embodiment. FIG. 5 is an example of a case of using the contention-based radio communication technique by assuming that the frame structure is similar to that in FIG. 4. In the contention-based radio communication technique, the terminal apparatus can perform data transmission immediately after occurrence of data. In a case that data occurs before subframe #1, the terminal apparatus performs data transmission illustrated in the example in FIG. 5. A transmission terminal identification signal is transmitted in subframe #1, and data is transmitted in subframe #2. The transmission terminal identification signal and a data transmission method will be described later in detail.

Figure 6:
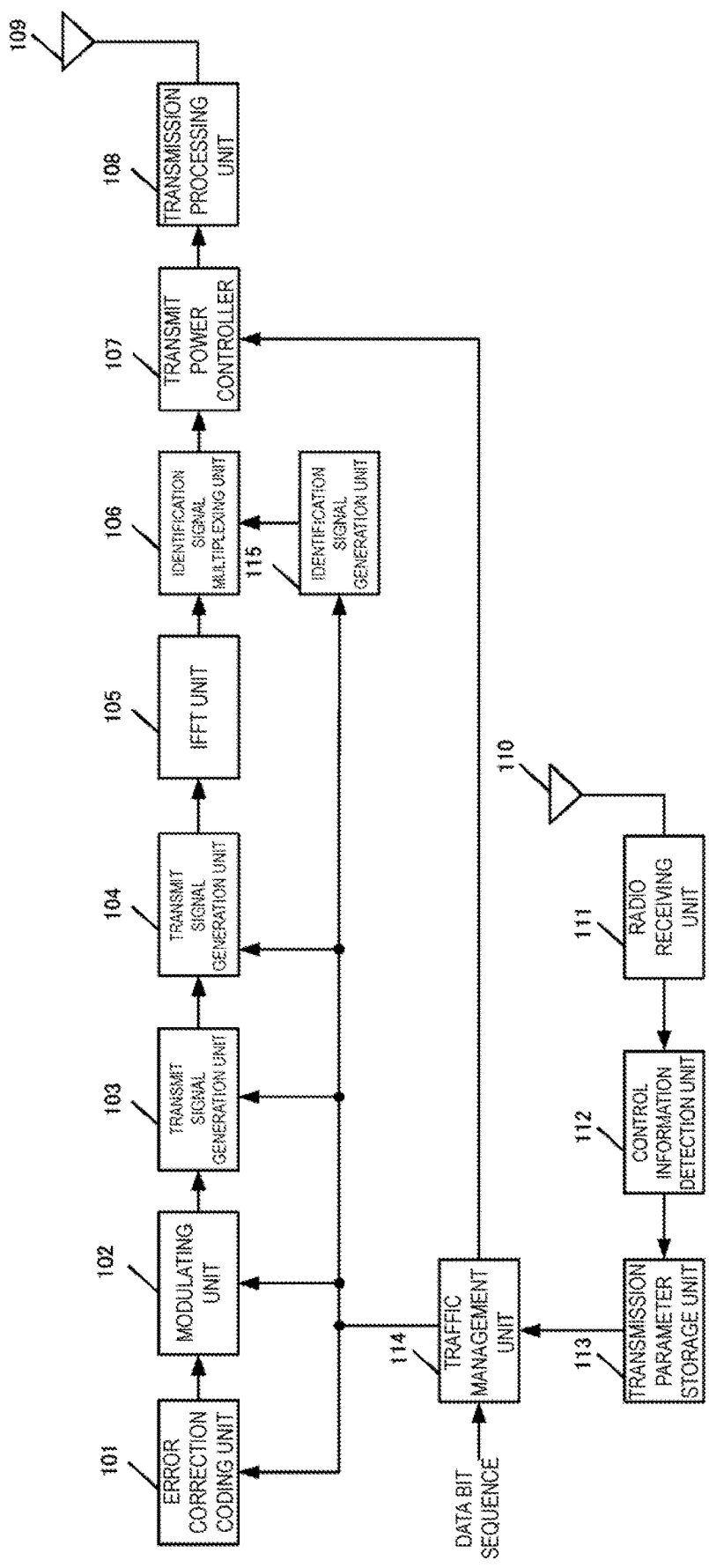
FIG. 6 is a diagram illustrating an example of a configuration of the terminal apparatus according to the present embodiment.

FIG. 6 illustrates an example of a configuration of the terminal apparatus according to the present embodiment. Note that the minimum number of blocks necessary for the present invention are illustrated. A description will be given on the assumption that the terminal apparatus can use both the contention-based radio communication technique and the non-contention-based radio communication technique, which is the above-described known technique, for MTC data transmission as the terminal apparatuses 20-1 to 20-Nm. However, the present invention is also applicable to a case in which the terminal apparatus can use only the contention-based radio communication technique. In this case, no processing relating to the non-contention-based radio communication technique exists, but the basic configuration is similar to this. The terminal apparatus receives control information transmitted from the base station apparatus on the EPDCCH, the PDCCH, or the PDSCH, via the receive antenna 110. The radio receiving unit 111 downconverts a received signal to a signal of a baseband frequency, performs Analog/Digital (A/D) conversion on a resultant signal, and inputs, to a control information detection unit 112, a signal obtained by removing a Cyclic Prefix (CP) from an obtained digital signal. The control information detection unit 112 detects a Downlink Control Information (DCI) format transmitted on the PDCCH or the EPDCCH and destined to the terminal apparatus itself, through blind decoding. In the blind decoding, decoding processing is performed on a Common Search Space (CSS) or a UE-specific Search Space (USS) that is a candidate to which the DCI format is mapped, to detect control information. Here, multiple formats are defined for the DCI format for different uses, and uplink single antenna DCI format 0, Multiple Input Multiple Output (MIMO) DCI format 4, and the like are defined, for example. The control information detection unit 112 also performs detection in a case of receiving an RRC signal. The control information detection unit 112 inputs the detected control information to a transmission parameter storage unit 113. In a case of receiving UL Grant, such as dynamic scheduling or SPS, the transmission parameter storage unit 113 inputs the control information to a traffic management unit 114. In a case of receiving configuration control information through RRC, the transmission parameter storage unit 113 holds the control information until data transmission using the contention-based radio communication technique. The configuration control information held by the transmission parameter storage unit 113 will be described later in detail.

In a case that a bit sequence of transmission data is input, the control information is input upon reception of UL Grant, and the configuration control information for the contention-based radio communication technique has been received in advance, these pieces of control information are also input to the traffic management unit 114. The type, QoS, and the like of transmission data may also be input to the traffic management unit 114. The traffic management unit 114 selects to use the contention-based or the non-contention-based radio communication technique, based on the input information, inputs the transmission parameter corresponding to the selected radio communication technique, to an error correction coding unit 101, a modulating unit 102, a transmit signal generation unit 103, a signal multiplexing unit 104, and an identification signal generation unit 115, and inputs a data bit sequence to the error correction coding unit 101.

The error correction coding unit 101 performs coding with error correction code on the input data bit sequence. As the error correction code, turbo code, Low Density Parity Check (LDPC) code, convolutional code, Polar code, or the like is used, for example. The type of error correction code and the coding rate used by the error correction coding unit 101 may be determined by a transmission and/or reception device in advance, may be input from the traffic management unit 114, or may be switched depending on the used technique among the contention-based and non-contention-based radio communication technique. In a case that the kind of error correction code and the coding rate are notified as control information, these pieces of information are input from the traffic management unit 114 to the error correction coding unit 101. The error correction coding unit 101 may perform puncturing or interleaving on the coding bit sequence according to the coding rate to apply. In a case of performing interleaving on the coding bit sequence, the error correction coding unit 101 performs interleaving for configuring a different sequence for each terminal apparatus. The error correction coding unit 101 may apply scrambling. Application of scrambling may be allowed only in a case that a scrambling pattern used by each terminal apparatus can be uniquely identified by using an identification signal to be described later.

The modulating unit 102 receives an input of information on a modulation scheme from the traffic management unit 114 and performs modulation on a coding bit sequence input from the error correction coding unit 101, to thereby generate a modulation symbol sequence. The modulation scheme is, for example, Quaternary Phase Shift Keying (QPSK) or 16-ary Quadrature Amplitude Modulation. Alternatively, the modulation scheme may not necessarily be Gray labeling, and set partitioning may be used. Gaussian Minimum-Shift Keying (GMSK) may be used. The modulating unit 102 outputs the generated modulation symbol sequence to the transmit signal generation unit 103. Here, the modulation scheme or the modulation method may be determined by the transmission and/or reception device in advance, may be input from the traffic management unit 114, or may be switched depending on the used technique among the contention-based and non-contention-based radio communication technique.

Figure 7A:
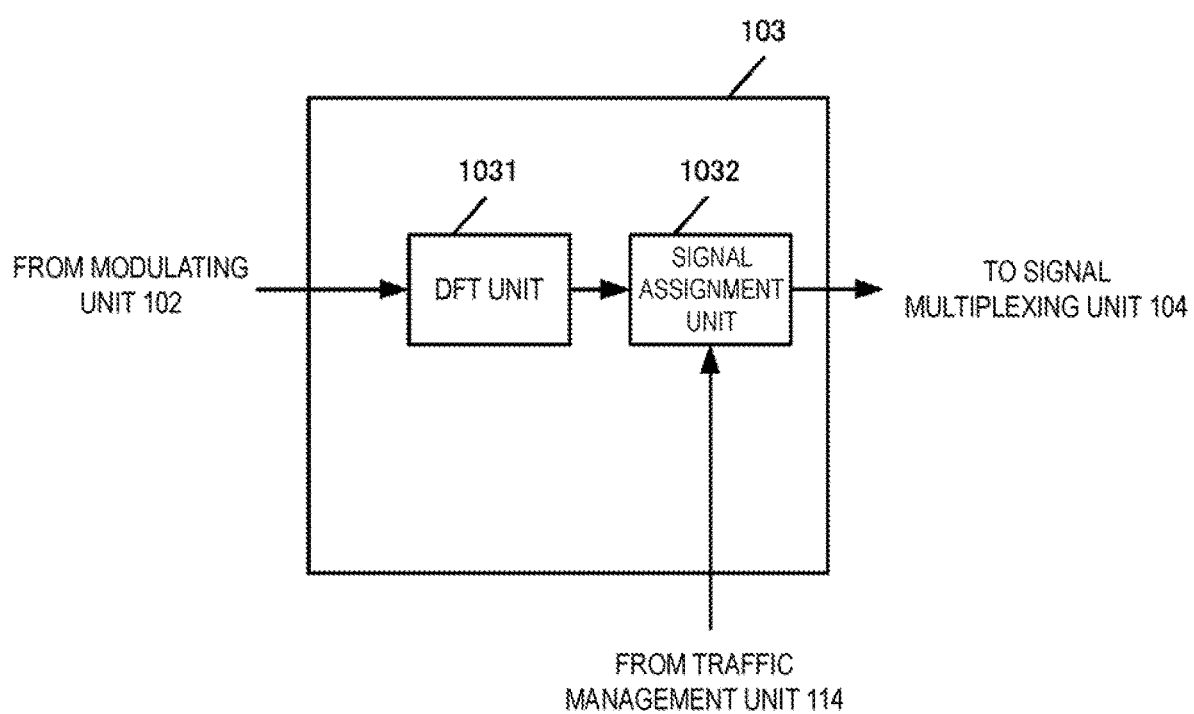
FIG. 7A is a diagram illustrating an example of a configuration of a transmit signal generation unit 103 according to the present embodiment.
Figure 7B:
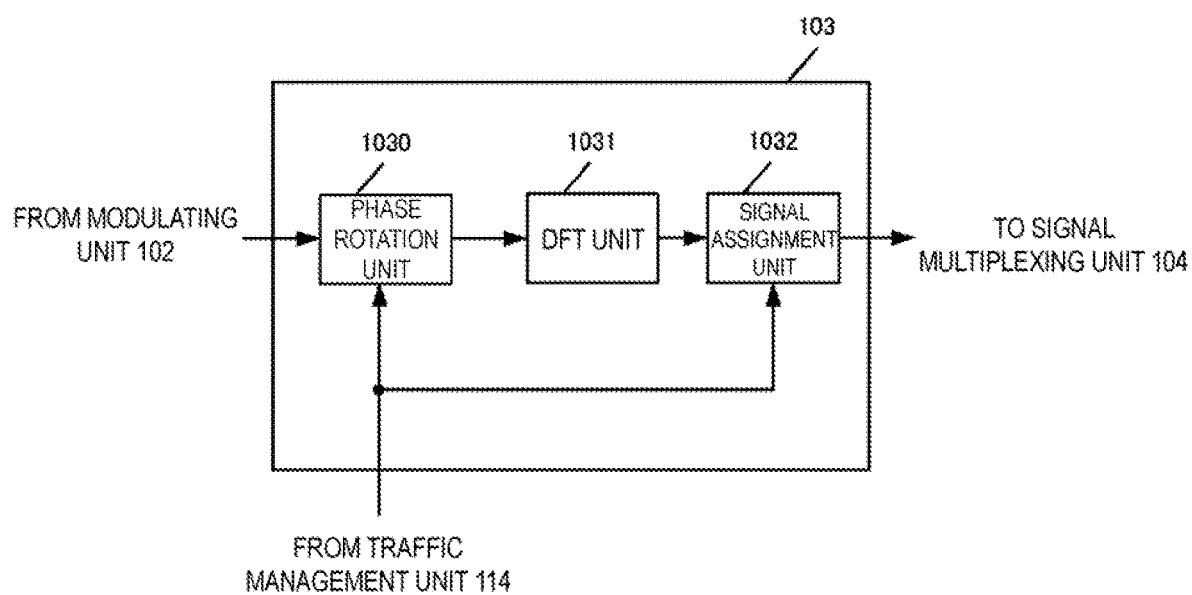
FIG. 7B is a diagram illustrating an example of the configuration of the transmit signal generation unit 103 according to the present embodiment.
Figure 7C:
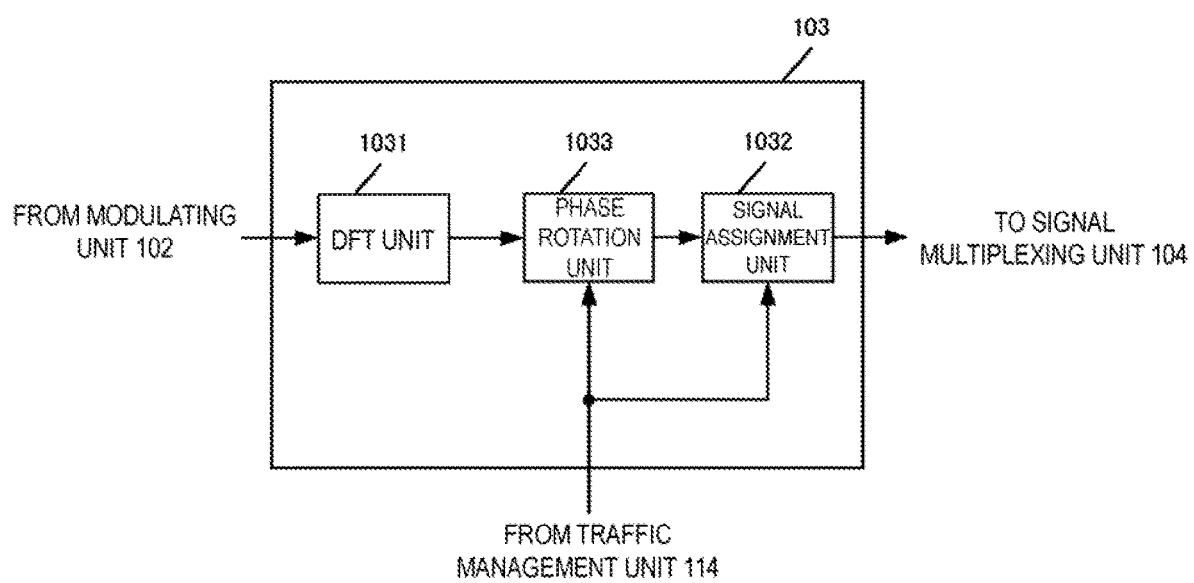
FIG. 7C is a diagram illustrating an example of the configuration of the transmit signal generation unit 103 according to the present embodiment.

FIGS. 7A to 7C illustrate examples of a configuration of the transmit signal generation unit 103 according to the present embodiment. In FIG. 7A, a DFT unit 1031 performs discrete Fourier transform on input modulation symbols to transform a time domain signal to a frequency domain signal, and then outputs the obtained frequency domain signal to a signal assignment unit 1032. The signal assignment unit 1032 receives an input of Resource allocation information, which is information of one or more Resource Blocks (RBs) to be used for data transmission, from the traffic management unit 114 and assigns the frequency-domain transmit signal to the specified RB(s). The resource allocation information input from the traffic management unit 114 is notified through UL Grant in a case of the non-contention-based radio communication, while being notified in advance through configuration control information in a case of the contention-based radio communication technique. Here, one RB is defined by 12 subcarriers and one slot (seven OFDM symbols), and the resource allocation information is information for allocating one subframe (two slots). In the LTE, one subframe is defined as 1 msec, and each subcarrier interval is defined as 15 kHz. However, the time period of one subframe and the subcarrier interval may vary, for example, 2 msec and 7.5 kHz, 0.2 msec and 75 kHz, 0.1 msec and 150 kHz, and the like, and resource allocation information may be notified by the unit of one subframe even in a different frame structure. The resource allocation information may be for notification of allocation of multiple subframes irrespective of a case of having a similar subframe structure to that of the LTE or a case of having a different subframe structure from that of the LTE, may be for notification of allocation by slot, may be for notification of allocation by the unit of OFDM symbol, or may be for notification of allocation by the unit of two OFDM symbols. The resource allocation information may be, instead of by RB, by the unit of one subcarrier, by Resource Block Group (RBG) configured of multiple RBs, or may be for allocation of one or more RBGs.

In FIG. 7B, a phase rotation unit 1030 performs phase rotation on input modulation symbols. For the phase rotation performed on a time-domain data signal in the phase rotation unit 1030, a pattern input from the traffic management unit 114 is used to apply a different pattern for each terminal apparatus. Examples of the phase rotation pattern are a pattern for performing different phase rotation for each modulation symbol and the like. The phase rotation pattern input from the traffic management unit 114 is assumed to be shared by the terminal apparatus and the base station apparatus by being notified through UL Grant, being notified through configuration control information in advance, or the like. The DFT unit 1031 and the signal assignment unit 1032 are similar to those in FIG. 7A, and hence descriptions thereof are omitted. Here, although the example in which phase rotation is performed on a time-domain data signal is illustrated in FIG. 7B, similar effects may be obtained in a different method. For example, a different cyclic delay may be set to a frequency-domain signal obtained by the DFT unit 1031, for each terminal apparatus. Specifically, assume that frequency-domain signals of the terminal apparatus 20-$u$ with no cyclic delay are $S_U(1)$, $S_U(2)$, $S_U(3)$, and $S_U(4)$. In this case, cyclic delay with a delay amount of one symbol is set for the terminal apparatus 20-$i$ to obtain $S_i(4)$, $S_i(1)$, $S_i(2)$, and $S_i(3)$, for example.

The DFT unit 1031 and the signal assignment unit 1032 in FIG. 7C are similar to those in FIG. 7A, and hence descriptions thereof are omitted. A phase rotation unit 1033 performs phase rotation on the frequency-domain data signal obtained by the DFT unit 1031. For the phase rotation performed on the frequency-domain data signal in the phase rotation unit 1033, a pattern input from the traffic management unit 114 is used to apply a different pattern for each terminal apparatus. Examples of the phase rotation pattern are one in which different phase rotation is performed for each frequency-domain data signal, and the like. The phase rotation pattern input from the traffic management unit 114 is assumed to be information shared by the terminal apparatus and the base station apparatus by being notified through UL Grant, being notified through configuration control information in advance, or the like. Here, although the example in which phase rotation is performed on a frequency-domain data signal is illustrated in FIG. 7C, similar effects may be obtained in a different method. For example, a different cyclic delay may be set to modulation symbols before transform to a frequency-domain signal by the DFT unit 1031, for each terminal apparatus. Specifically, assume that frequency-domain signals of the terminal apparatus 20-$u$ with no cyclic delay are $s_U(1)$, $s_U(2)$, $s_U(3)$, and $s_U(4)$. In this case, cyclic delay with a delay amount of one is set for the terminal apparatus 20-$i$ to obtain $s_i(4)$, $s_i(1)$, $s_i(2)$, and $s_i(3)$, for example. Both the phase rotation unit 1030 and the phase rotation unit 1033 in FIG. 7B and FIG. 7C may be used. The transmit signal generation unit 103 in each of FIGS. 7A to 7C inputs a transmit signal to the signal multiplexing unit 104.

Figure 8:
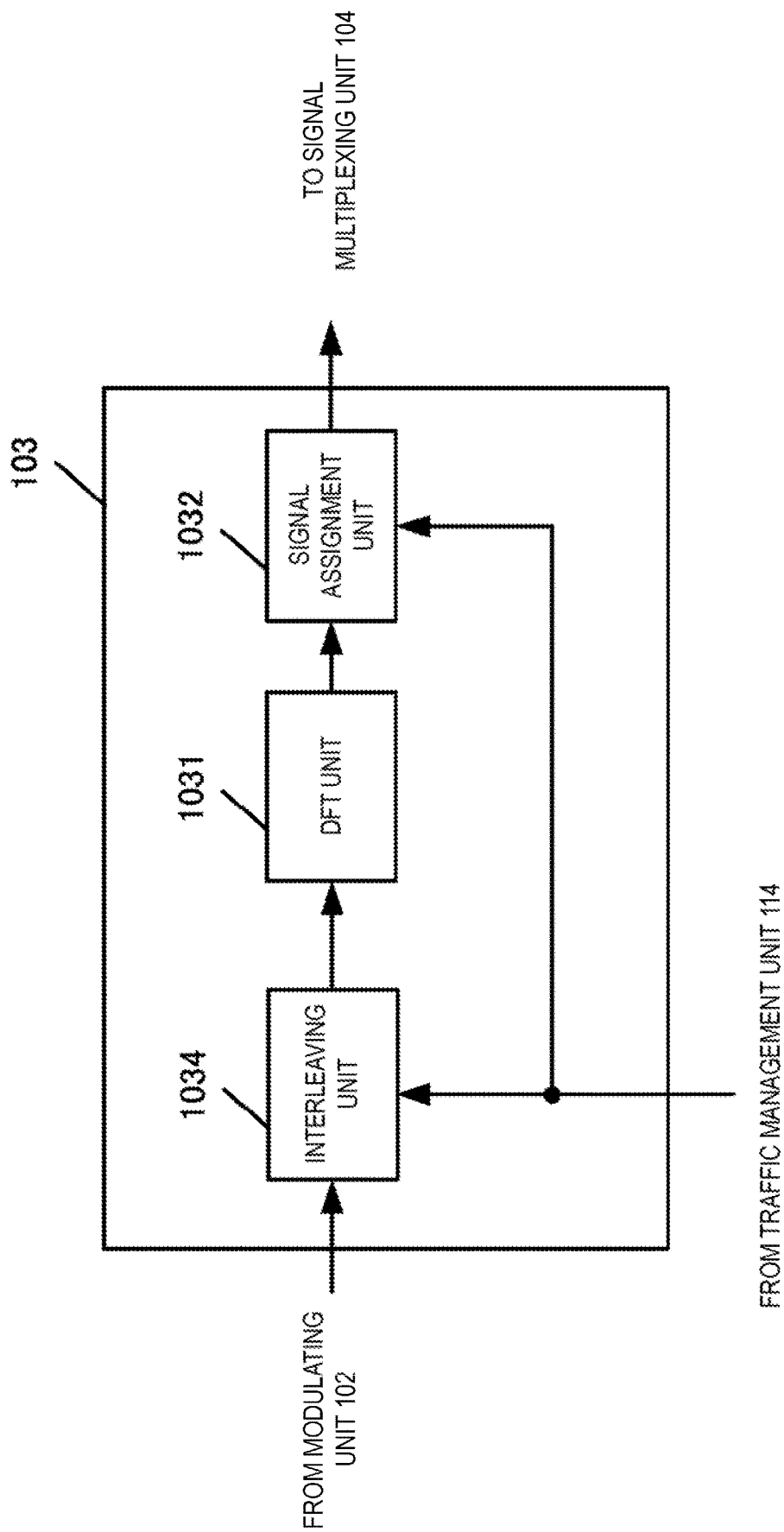
FIG. 8 is a diagram illustrating an example of the configuration of the transmit signal generation unit 103 according to the present embodiment.

The configuration of the transmit signal generation unit 103 may be the configuration in FIG. 8. In this example, the transmit signal generation unit 103 performs interleaving on the modulation symbols input before the DFT unit 1031. In a case that interleaving is performed on the modulation symbols, interleaving for configuring a different sequence for each terminal apparatus is performed.

Figure 9:
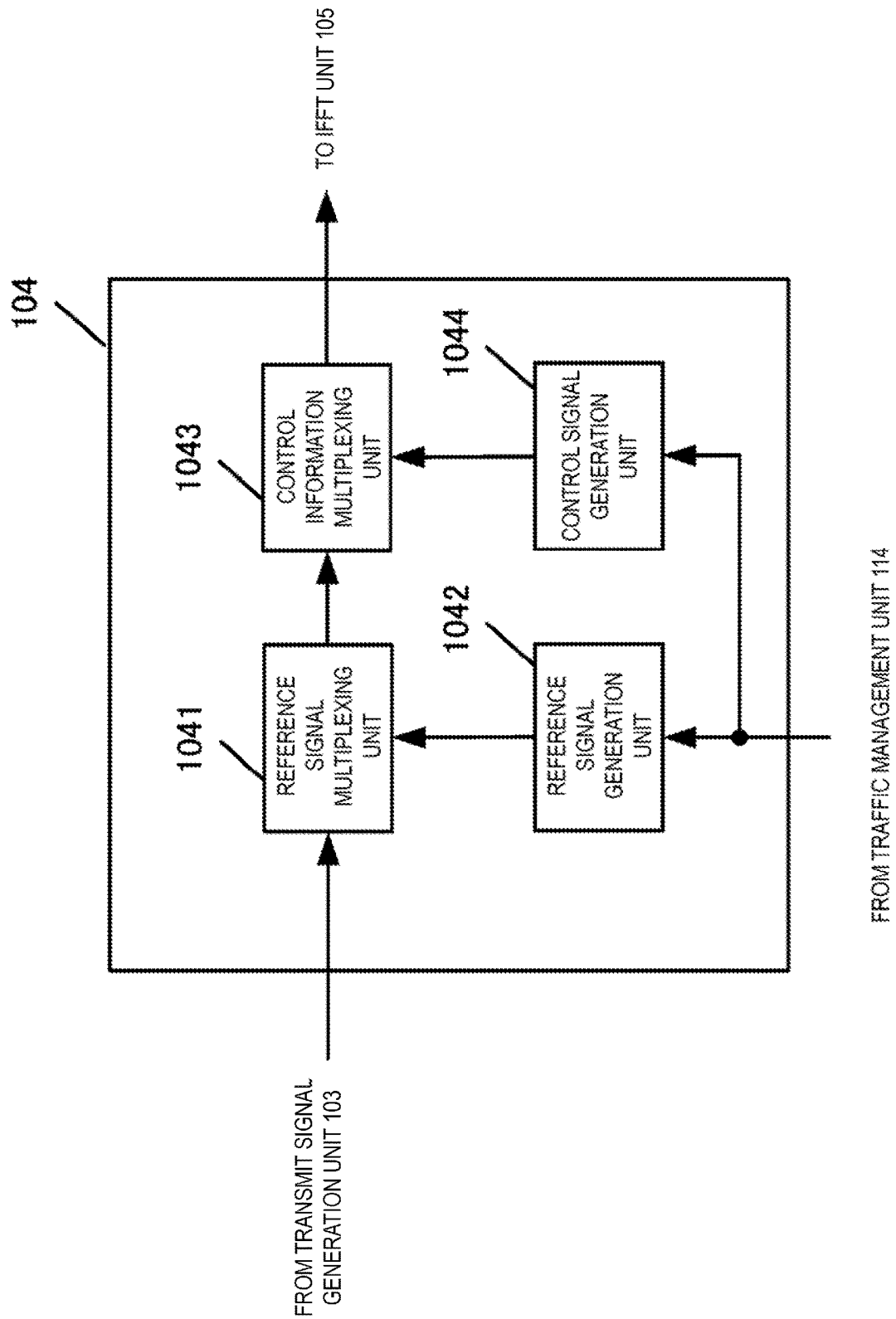
FIG. 9 is a diagram illustrating an example of a configuration of a signal multiplexing unit 104 according to the present embodiment.

FIG. 9 illustrates an example of a configuration of the signal multiplexing unit 104 according to the present embodiment. The transmit signal input from the transmit signal generation unit 103 is input to a reference signal multiplexing unit 1041. Moreover, the traffic management unit 114 inputs a parameter for generating a reference signal to a reference signal generation unit 1042 and inputs control information to be transmitted to the base station apparatus, to a control information generation unit 1044. The reference signal multiplexing unit 1041 multiplexes the input transmit signal and a reference signal sequence (DMRS) generated by the reference signal generation unit. By thus multiplexing the transmit signal and the DMRS, the frame structure in FIG. 4 is generated. The frame structure in FIG. 5 will be described later. Note that, in a case that the reference signal is mapped to different OFDM symbols from the data signal as in the frame structure in FIG. 4, the reference signal multiplexing unit 1041 may multiplex the data signal and the reference signal in the time domain.

Meanwhile, the control signal generation unit 1044 generates Channel State Information (CSI), Scheduling Request (SR), and Acknowledgement/Negative Acknowledgement (ACK/NACK) of uplink control information to be transmitted on the Physical Uplink Control CHannel (PUCCH) and outputs these to a control information multiplexing unit 1043. The control information multiplexing unit 1043 multiplexes the control information to the frame structure configured of the data signal and the reference signal. The signal multiplexing unit 104 inputs a generated transmission frame to an IFFT unit 105. In a case that the terminal apparatus is not capable of transmitting the PUSCH and the PUCCH simultaneously, the terminal apparatus transmits only the signal with high priority according to the priority levels of signals determined in advance. Similarly in a case that the terminal apparatus is not capable of transmitting the PUSCH and the PUCCH simultaneously due to a lack of transmit power, the terminal apparatus transmits only the signal with high priority according to the priority levels of signals determined in advance. Different priority levels for transmission of a signal may be assigned to a case of the contention-based radio communication technique and the non-contention-based radio communication technique. Alternatively, the priority of the data to transmit exists, and according to the priority, the priority of the PUSCH may vary.

The IFFT unit 105 receives an input of a frequency-domain transmission frame and performs inverse fast Fourier transform on each OFDM symbol, to thereby transform the frequency-domain signal sequence to the time-domain signal sequence. The IFFT unit 105 inputs the time-domain signal sequence to the identification signal multiplexing unit 106. The identification signal generation unit 115 generates a signal to transmit in a subframe for an identification signal in FIG. 5 and inputs the signal to the identification signal multiplexing unit 106. Details of the identification signal will be described later. The identification signal multiplexing unit 106 multiplexes the time-domain signal sequence and the identification signal to different subframes as in FIG. 5 and inputs a signal obtained through the multiplexing to a transmit power controller 107. Note that the identification signal multiplexing unit 106 may multiplex the time-domain signal and the identification signal to different OFDM symbols or different slots of the same subframe. The transmit power controller 107 performs transmit power control by using only an open-loop transmit power control value or both open-loop and closed-loop transmit power control values, and inputs the signal sequence after the transmit power control to a transmission processing unit 108. The transmit processing unit 108 inserts a CP into the input signal sequence, converts a resultant signal into an analog signal through Digital/Analog (D/A) conversion, and upconverts a signal after the conversion to a signal of a radio frequency to use for transmission. The transmission processing unit 108 amplifies a signal obtained through upconversion by a Power Amplifier (PA) and transmits a signal after the amplification via a transmit antenna 109. The terminal apparatus performs data transmission as described above. In a case that the terminal apparatus performs FIG. 7A in the transmit signal generation unit 103, this means that the terminal apparatus transmits a Discrete Fourier Transform Spread Orthogonal Frequency Division Multiplexing (DFTS-OFDM; also referred to as SC-FDMA) signal. In a case that the terminal apparatus performs FIG. 7B or FIG. 7C in the transmit signal generation unit 103, this means that the terminal apparatus transmits a signal obtained by applying phase rotation or cyclic delay to DFTS-OFDM. In a case that the terminal apparatus performs FIG. 8 in the transmit signal generation unit 103, this means that the terminal apparatus transmits a DFTS-OFDM signal. In a case of a configuration that the terminal apparatus does not perform DFT in the transmit signal generation unit 103, i.e., the DFT unit 1031 does not exist in any of FIGS. 7A to 7C and FIG. 8, this means that the terminal apparatus transmits an OFDM signal. The terminal apparatus may use the above-described method, or may use a different spread method or different transmit signal waveform generation method, in the transmit signal generation unit 103.

Figure 10:
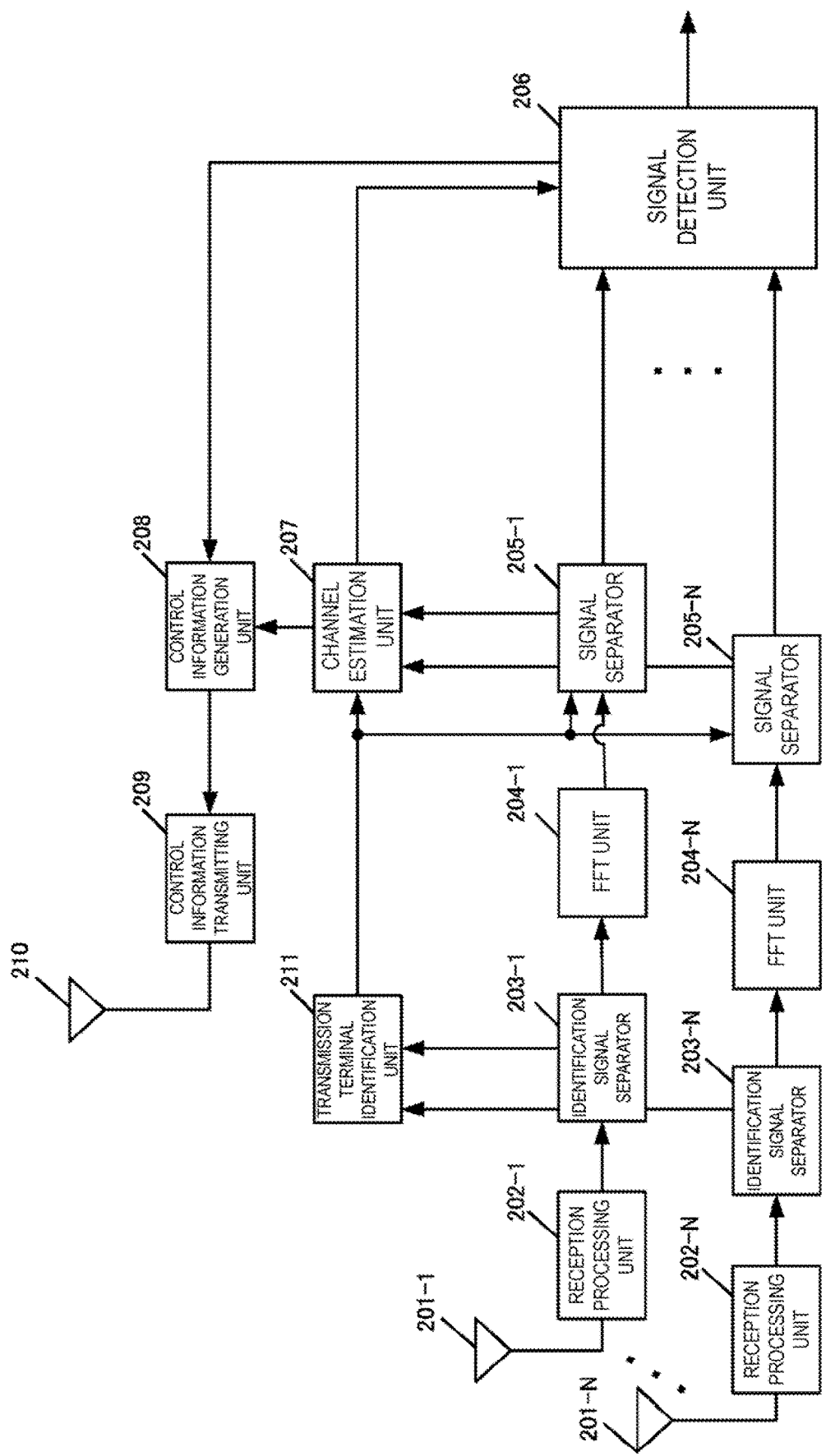
FIG. 10 is a diagram illustrating an example of a configuration of a base station apparatus according to the present embodiment.

FIG. 10 illustrates an example of a configuration of a base station apparatus according to the present embodiment. According to FIG. 10, the base station apparatus receives data transmitted from terminal apparatuses, at N receive antennas 201-1 to 201-N and inputs the data to respective receive antennas 202-1 to 202-N. The reception processing units 202-1 to 202-N downconvert receive signals to signals of baseband frequencies, perform A/D conversion on the resultant signals, and remove CPs from resultant digital signals. The reception processing units 202-1 to 202-N output the respective signals obtained through the removal of the CPs to identification signal separators 203-1 to 203-N. The identification signal separators 203-1 to 203-N separate identification signals and other signals and output the identification signals to the identification terminal identifying unit 211 and the other signals to FFT units 204-1 to 204-N. The transmission terminal identifying unit 211 identifies the terminal apparatuses that have transmitted the data with reference to the identification signals to be described later and outputs information on the transmission terminal apparatuses to a channel estimation unit 207 and signal separators 205-1 to 205-N. The FFT units 204-1 to 204-N convert input receive signal sequences from time-domain signal sequences to frequency-domain signal sequences through fast Fourier transform and output the obtained frequency-domain signal sequences to the respective signal separators 205-1 to 205-N.

Figure 11:
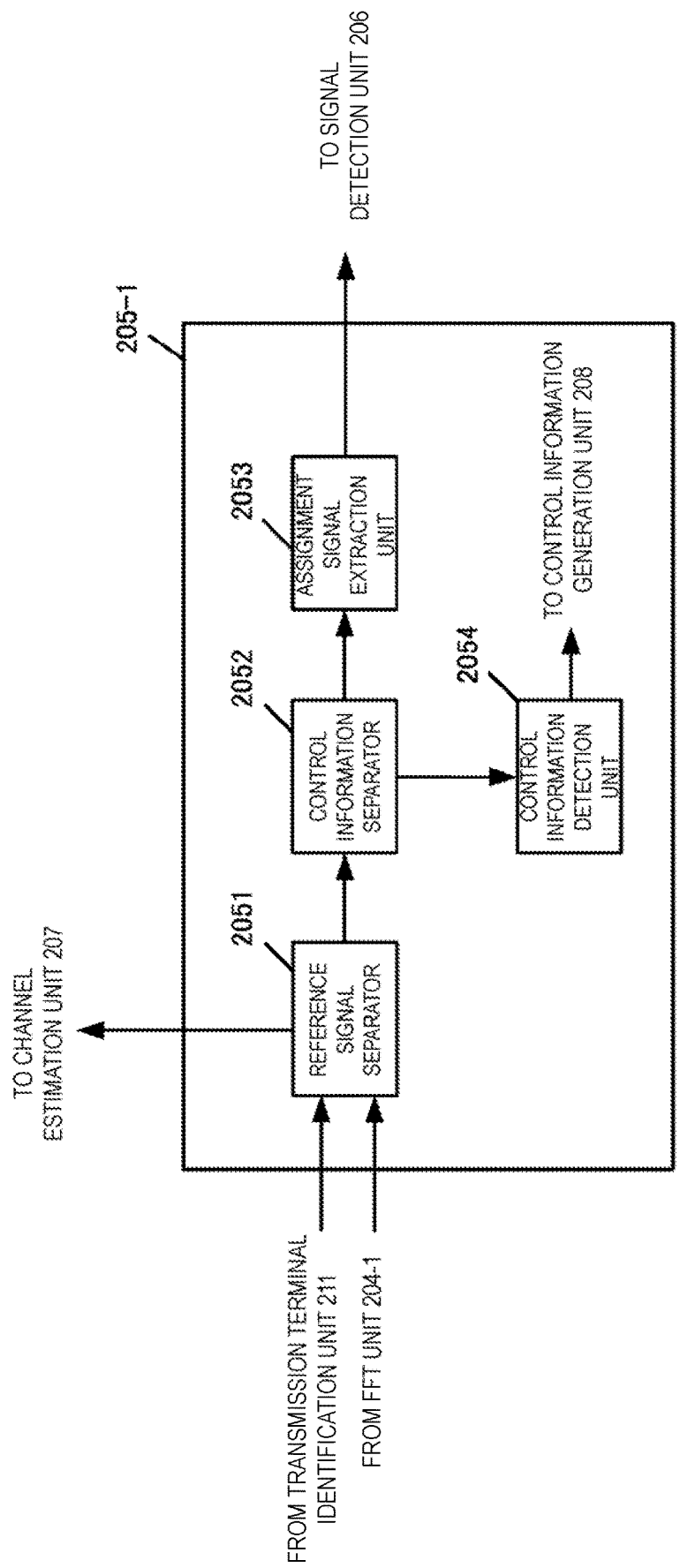
FIG. 11 is a diagram illustrating an example of a configuration of a signal separator 205-1 according to the present embodiment.

The signal separators 205-1 to 205-N all have a configuration in common, and FIG. 11 illustrates an example of a configuration of the signal separator 205-1 according to the present embodiment. According to FIG. 11, in the signal separator 205-1, a frequency-domain signal sequence is input from the FFT unit 204-1 and information on the identified transmission terminal apparatus is input from the transmission terminal identifying unit 211, to a reference signal separator 2041. The reference signal separator 2051 separates the frequency-domain signal sequence into a reference signal and other signals by using the input information on the transmission terminal apparatus and outputs the reference signal to the channel estimation unit 207 and the other signals to a control information signal separator 2052. The control information separator 2052 separates the input signals into a control signal and a data signal and outputs the control signal to a control information detection unit 2054 and a data signal to the assignment signal extraction unit 2053. The control information detection unit 2054 detects a signal transmitted on the PUCCH and outputs, to a control information generation unit 208, SR, CSI, and ACK/NACK to use respectively for uplink scheduling, downlink scheduling, and re-transmission control for downlink transmission. Meanwhile, the assignment signal extraction unit 2053 extracts a transmit signal for each terminal apparatus, based on resource allocation information notified the terminal apparatus through control information.

The channel estimation unit 207 receives an input of De-Modulation Reference Signal (DMRS), which is a reference signal transmitted by being multiplied with the data signal, and information on the identified transmission terminal apparatus, estimates frequency response, and outputs the frequency response estimated for demodulation to the signal detection unit 206. In a case that a Sounding Reference Signal (SRS) is input, the channel estimation unit 207 estimates frequency response to be used for the next scheduling. The control information generation unit 208 performs uplink scheduling and Adaptive Modulation and Coding (also referred to as link adaptation), based on the frequency response estimated based on the DMRS and/or SRS, generates a transmission parameter to be used by the terminal apparatus for uplink transmission, and performs conversion to the DCI format. In a case that information indicating whether or not the received data signal involves any error is input from the signal detection unit 205, the control information generation unit 208 generates control information for notification of ACK/NACK in the uplink transmission. Here, ACK/NACK in the uplink transmission is transmitted on at least one of the Physical HARQ CHannel (PHICH), the PDCCH, and the EPDCCH. The control information transmitting unit 209 receives an input of control information obtained through the conversion by the control information generation unit 208, assigns the input control information to the PDCCH and the EPDCCH, and transmits the control information to each terminal apparatus.

Figure 12:
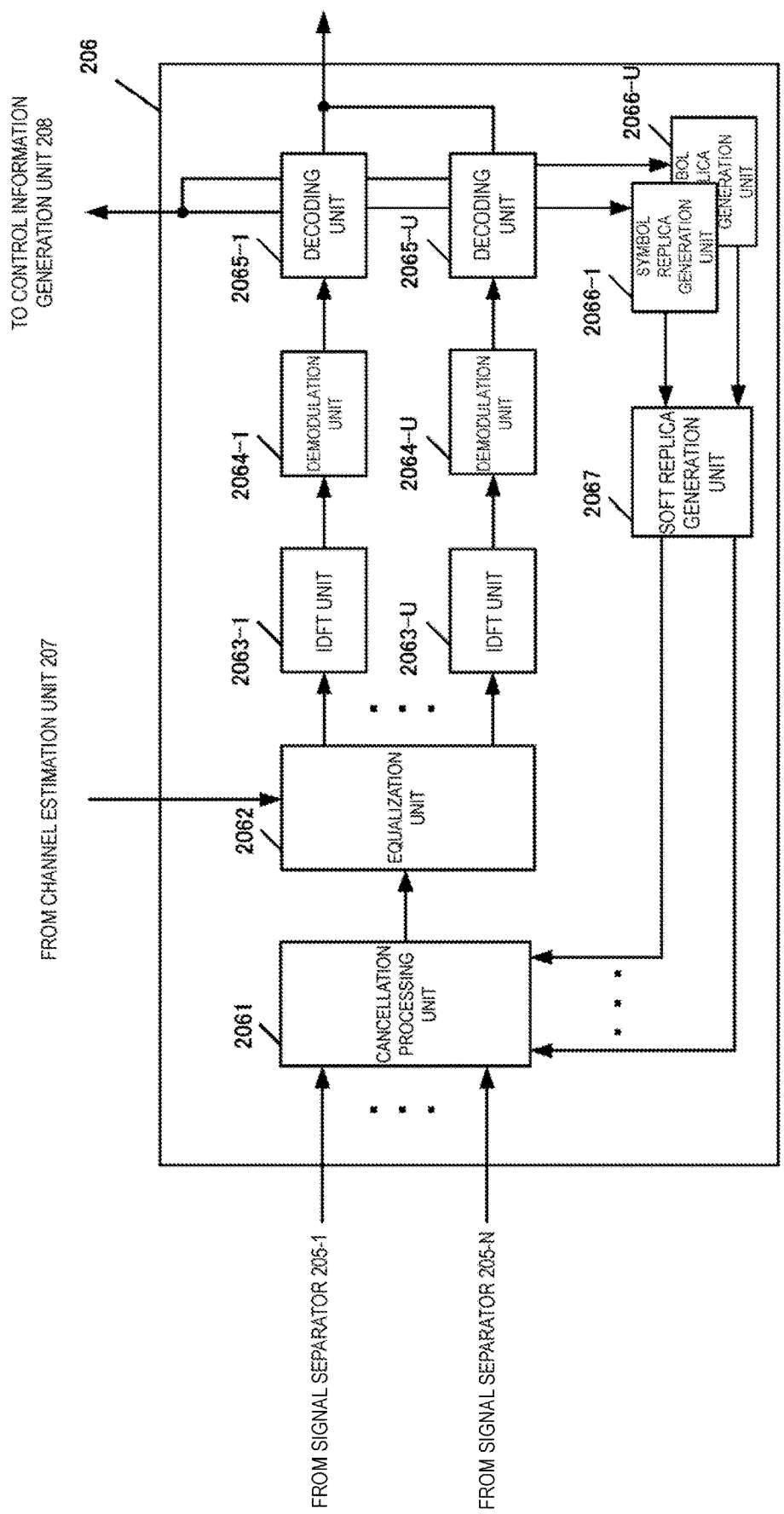
FIG. 12 is a diagram illustrating an example of a configuration of a signal detection unit 206 according to the present embodiment.

FIG. 12 illustrates an example of a configuration of the signal detection unit 206 according to the present embodiment. In the signal detection unit 206, a cancellation processing unit 2061 receives inputs of the signals extracted by the signal separators 205-1 to 205-N of the respective terminal apparatuses. The cancellation processing unit 2061 receives inputs of soft replicas from a soft replica generation unit 2067 and performs cancellation processing on each receive signal. An equalization unit 2062 generates equalization weights by using the frequency response input from the channel estimation unit 207, based on the MMSE principle and multiplies the signal obtained through the soft cancellation by the equalization weights. The equalization unit 2062 outputs the signals of the respective terminal apparatuses obtained through the equalization to the respective IDFT units 2063-1 to 2063-U. The IDFT units 2063-1 to 2063-U convert receive signals obtained through frequency-domain equalization to time-domain signals. In a case that any of the terminal apparatuses has performed cyclic delay, phase rotation, or interleaving on the signal before or after the DFT in transmission processing, processing for restoring from cyclic delay, phase rotation, or the interleaving is performed on the receive signal obtained through frequency-domain equalization or the time-domain signal. The demodulation units 2064-1 to 2064-U receive inputs of information on a modulation scheme notified in advance or predetermined although not illustrated, perform demodulation processing on the receive signal sequences in time domain, to thereby obtain Log Likelihood Ratios (LLRs) in bit sequence, i.e., LLR sequences.

The decoding units 2065-1 to 2065-U receive inputs of information on a coding rate notified in advance or predetermined although not illustrated, perform demodulation processing on the LLR sequences. Here, to perform cancellation processing such as Successive Interference Canceller (SIC) or turbo equalization, the decoding units 2065-1 to 2065-U output external LLRs or post LLRs of decoder outputs to the symbol replica generation units 2066-1 to 2066-U. The difference between the external LLRs and the post LLRs is whether or not to subtract prior LLRs to be input to the decoding units 2065-1 to 2065-U from the respective LLRs obtained through decoding. In a case that the terminal apparatuses have performed puncturing, interleaving, or scrambling on a coded bit sequence after error correction coding in transmission processing, the signal detection unit 206 performs depuncturing (inserting 0 into the LLRs of bits obtained through puncturing), deinterleaving (restoring from interleaving), or descrambling on LLR sequences to be input to the decoding units 2065-1 to 2065-U. The symbol replica generation units 2066-1 to 2066-U generate symbol replicas from the input LLR sequences according to the modulation schemes used by the terminal apparatuses for the data transmission and output the symbol replicas to the soft replica generation unit 2067. The soft replica generation unit 2067 transforms the input symbol replicas into frequency-domain signals through DFT and assigns the signals to the resources used by the terminal apparatuses, to generate soft replicas by multiplying the signals by frequency responses. In a case that the number of repetitions of SCI processing and/or turbo equalization reaches a prescribed number of times, the decoding units 2065-1 to 2065-U make hard decisions for the LLR sequences after the decoding, determine whether there is any error bit through Cyclic Redundancy Check (CRC), and outputs information indicating whether or not there is any error bit to the control information generation unit 208.

Figure 13:
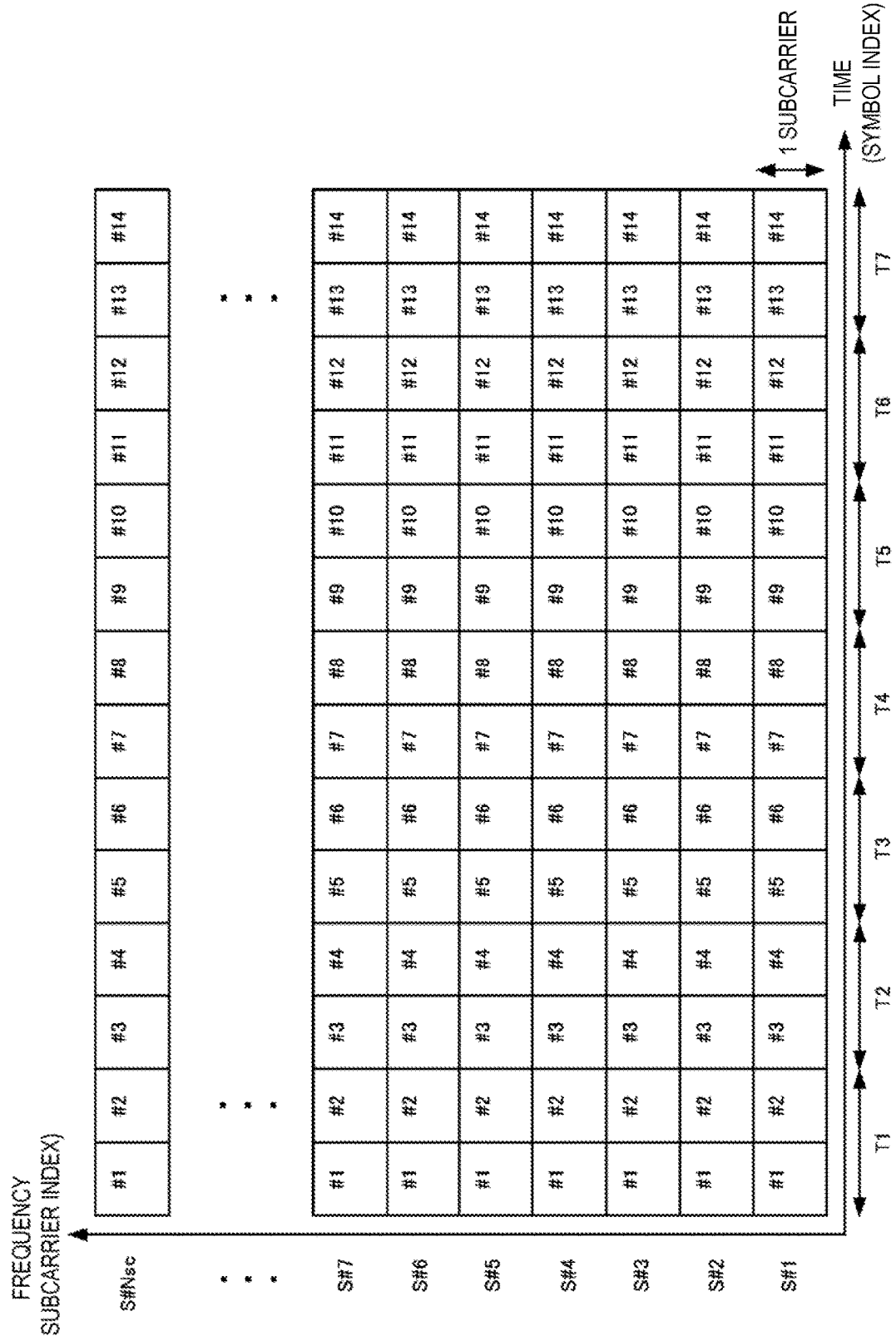
FIG. 13 is a diagram illustrating an example of a configuration of identification signals of transmission terminal apparatuses according to the present embodiment.

FIG. 13 illustrates an example of configurations of identification signals of transmission terminal apparatuses according to the present embodiment. Here, assume that the number of OFDM symbols usable for transmission of identification signals is $N_{OFDM}$ and the number of subcarriers usable for transmission of identification signals is $N_{SC}$. Moreover, the number of OFDM symbols used by each transmission terminal to transmit an identification signal is $T_{OFDM}$, and, in a case of using Orthogonal Cover Code (OCC) in the time direction, the transmission terminal uses an OCC sequence having a length of $T_{OCC}$. Note that the OCC sequence length may be any as long as being a value satisfying $1 \leq T_{OCC} \leq T_{OFDM}$ and information on the OCC sequence length to be used may be shared in advance by transmission and reception devices. Furthermore, the number of subcarriers to be used by each transmission terminal to transmit an identification signal is assumed to be $T_{SC}$. In a case of using Cyclic Shift (CS) in the frequency direction, the number $T_{CS}$ of CS patterns is used; and in a case of using Interleaved Frequency Division Multiple Access (IFDMA), the number $T_{RF}$ of multiplexing patterns is used. Hence, the number of orthogonal resources for identification signals is $(N_{OFDM}/T_{OFDM}) \times T_{OCC} \times (N_{SC}/T_{SC}) \times T_{CS} \times T_{RF}$. FIG. 13 is an example of a case in which the time-frequency resource in which an identification signal can be transmitted is one subframe ($N_{OFDM}=14$), the number of subcarriers is $N_{SC}$, and $T_{OFDM}=T_{OCC}=2$, but the present invention is not limited to this example. In the case of FIG. 13, assume that $N_{SC}=T_{SC}=48$ and $T_{CS}=12$, and $T_{RF}=2$, there exist 336 orthogonal resources. Configuration control information transmitted from the base station apparatus includes information indicating an orthogonal resource in which the identification signal is to be transmitted. Assume that each of OFDM symbol sets T1 to T7 is defined for two consecutive OFDM symbols as in FIG. 13 for two OFDM symbols for transmitting an identification signal, the index of an OFDM symbol set to be actually used is $I_T$, X pieces of information of subcarrier sets to be used in a case of $N_{SC} > T_{SC}$ are defined as F1 to FX, the index of the subcarrier set to be actually used is $I_F$, the index of OCC sequence to be used is $I_{OCC}$, the CS pattern to be used is $I_{CS}$, and the multiplexing pattern of the IFDMA to be used is $I_{RF}$. In this case, the configuration control information transmitted from the base station apparatus includes information uniquely indicating ($I_T$, $I_F$, $I_{OCC}$, $I_{CS}$, $I_{RF}$). The configuration control information may be information including only part of ($I_T$, $I_F$, $I_{OCC}$, $I_{CS}$, $I_{RF}$). Note that the OFDM symbol set need not be consecutive OFDM symbols and may be a combination such as OFDM symbol #1 and OFDM symbol #8. Moreover, a subcarrier set need not be consecutive subcarriers, and, for example, an integral multiple of $T_{RF}$ may be defined as a cluster of an identification signal and clusters of multiple identification signals may be inconsecutively used on the frequency axis. Subcarriers S #1 to S #$N_{SC}$ usable for transmission of identification signals may be the same as or different from the subcarriers for data transmission. In a case that the subcarriers S #1 to S #$N_{SC}$ are different from the subcarriers usable for transmission of identification signals, only part of subcarriers may overlap. The subcarriers S #1 to S #$N_{SC}$ may be the same as or different from the subcarriers used for transmission of identification signals. In a case that the subcarriers S #1 to S #$N_{SC}$ are different from the subcarriers to be used for transmission of identification signals, only part of subcarriers may overlap. In a case that the number of terminal apparatuses accommodated by the base station apparatus exceeds the number of orthogonal resources for the identification signals, the same orthogonal resources need to be allocated for different terminal apparatuses in an overlapping manner. In this case, transmission terminal apparatuses need to be identified by terminal-apparatus-specific identifiers in addition to orthogonal resources for the identification signals. Specifically. CRC added to each data signal is subjected to exclusive-OR operation using a terminal-apparatus-specific ID, such as a Cell-Radio Network Temporary Identifier (C-RNTI) or SPS C-RNTI. In this manner, a receiving-side base station apparatus performs exclusive-OR operation on multiple identifiers and CRC after signal detection using SIC, turbo equalization, or the like, and identifies each identifier with no error detected through CRC, to thereby perform identification of the transmission terminal apparatus.

Figure 14:
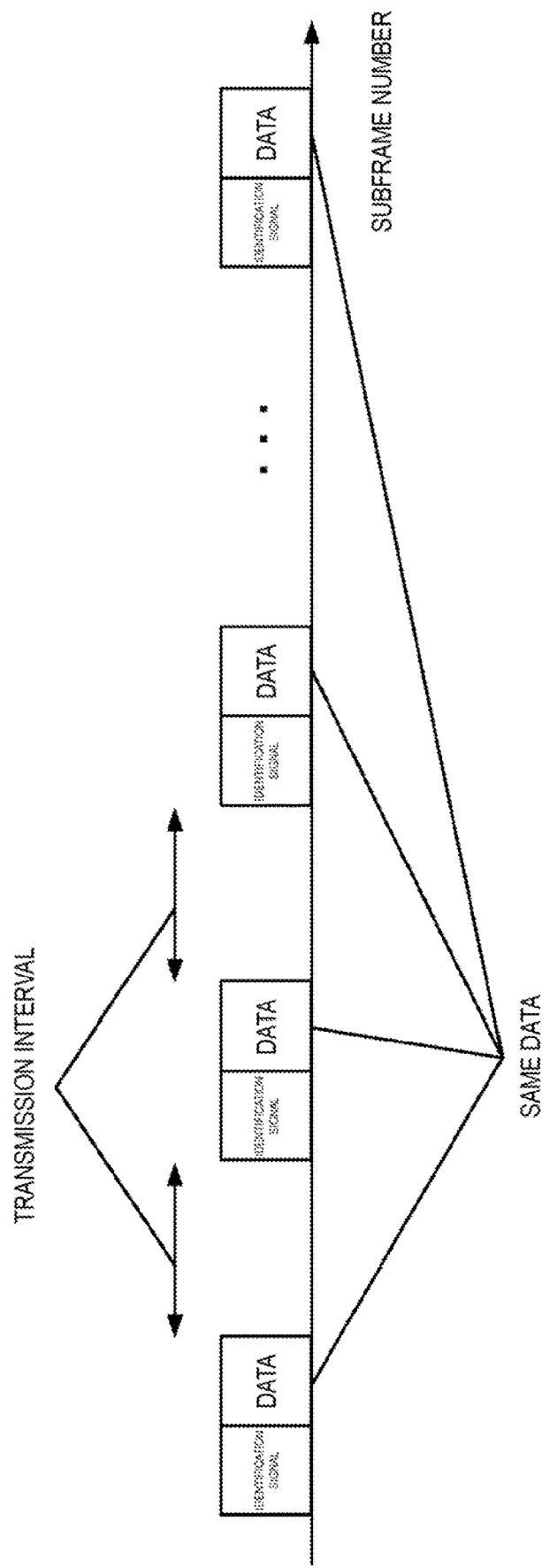
FIG. 14 is a diagram illustrating an example of identification signals and data transmissions of the terminal apparatuses according to the present embodiment.

FIG. 14 illustrates an example of identification signals and data transmission of the terminal apparatuses according to the present embodiment. As illustrated in FIG. 14, data transmission is performed multiple times in transmission of data in the present embodiment. As a result, a prescribed quality required for uplink data transmission of each terminal apparatus is satisfied. Here, in the known LTE and the like, each of all the terminal apparatuses performs retransmission of data after a prescribed time from data transmission.

In the present embodiment, to enable channel estimation using each identification signal, data is mapped without performing DMRS transmission in OFDM symbols #4 and #11 in a data transmission subframe (UL transmission subframe) in the frame structure in FIG. 5. Hence, the number of bits that can be transmitted per transmission opportunity increases. In the present embodiment, processing by the signal multiplexing unit 104 in the terminal apparatus in FIG. 9 varies. The reference signal multiplexing unit 1041 and the reference signal generation unit 1042 perform DMRS generation and multiplexing with a data signal. However, in the contention-based (Grant Free) radio communication technique, the identification signal and DMRS are shared, and thus the reference signal multiplexing unit 1041 and the reference signal multiplexing unit 1042 do not perform anything. However, in a case that the terminal apparatus also uses the non-contention-based radio communication technique, the reference signal multiplexing unit 1041 and the reference signal generation unit 1042 perform DMRS generation and multiplexing with a data signal, in data transmission in the non-contention-based radio communication technique. Moreover, in the present embodiment, the processing performed by the signal separators 205-1 to 205-N in the base station apparatus in FIG. 11 varies. The reference signal separator 2051 separates DMRS but does not perform anything in the contention-based radio communication technique, since the identification signal and DMRS are shared. However, in a case that the terminal apparatus also uses the non-contention-based radio communication technique, the reference signal separator 2051 separates DMRS in data transmission in the non-contention-based radio communication technique.

Figure 15A:
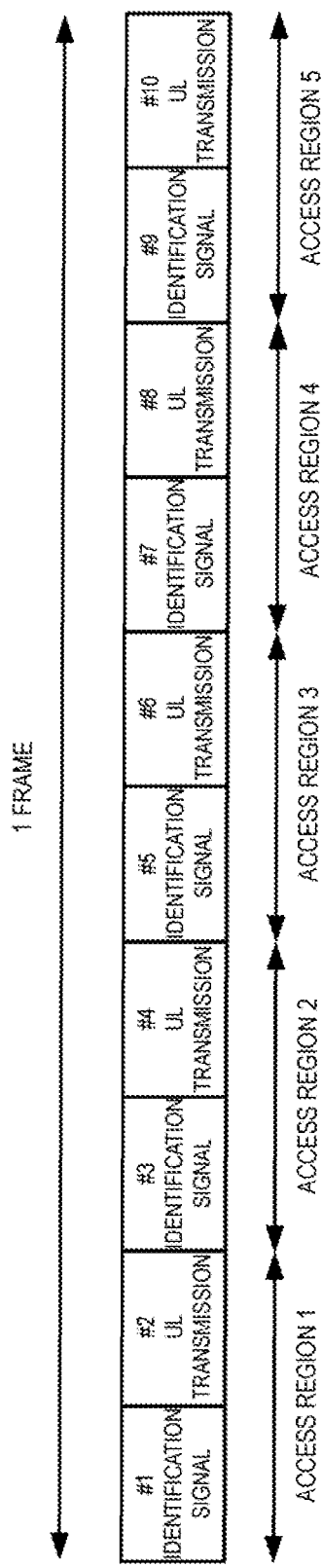
FIG. 15A is a diagram illustrating an example of an uplink frame structure according to the radio communication technique of the present embodiment.
Figure 15B:
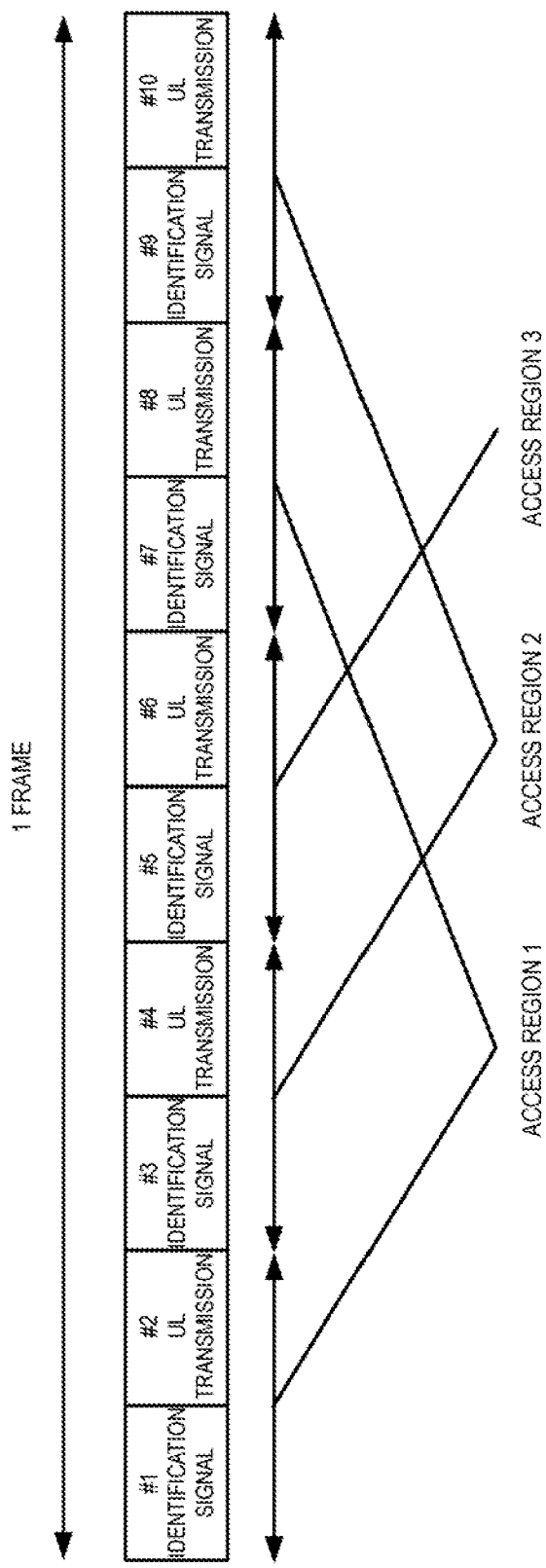
FIG. 15B is a diagram illustrating an example of the uplink frame structure according to the radio communication technique of the present embodiment.

Each of FIG. 15A and FIG. 15B illustrates an example of an uplink radio frame structure according to a radio communication technique in the present embodiment. FIG. 15A is an example in which a subframe for transmitting an identification signal and a subframe for data transmission (UL transmission) form one subframe set, and subframe sets are configured as access regions 1 to 5. The base station apparatus transmits configuration control information (S200 in FIG. 3) for allowing, for each terminal apparatus to accommodate, data transmission in the contention-based radio communication technique in at least one of access regions 1 to 5. Here, transmission permission for access regions 1 to 5 may be notified using control information indicating one or more access regions, may be notified using control information indicating only one access region, or control information indicating only two access regions, in a bitmap. In this way, the access region(s) in which the contention-based radio communication technique can be used is limited for each terminal apparatus. For example, by setting, in different access regions, terminal apparatuses in which data transmission occurs at the same timing, the probability of data transmission collision can be reduced. Moreover, by setting, in different access regions, terminal apparatuses in which orthogonal resources for identification signals overlap, a reduction in accuracy in identification of transmission terminals due to collision of orthogonal resources for identification signals can be prevented. By the base station apparatus allowing data transmission in the contention-based radio communication technique as many access regions as possible for transmission terminals with high data transmission frequency or with need of reducing delay time to data transmission, the QoS or the QoE of each terminal apparatus can be met.

Meanwhile, FIG. 15B is an example in which an access region is configured of multiple subframe sets. FIG. 15B is an example in which two subframe sets are assigned to each of access regions 1 and 2 and one subframe set is assigned to access region 3. In this case, the number of terminal apparatuses allowed data transmission in the contention-based radio communication technique in each of access regions 1 and 2 may be set twice as many as that in access region 3. As another example of using access regions 1 to 3, a number of terminal apparatuses are allowed to use access regions 1 and 2, and a few terminal apparatuses requiring reliability may be allowed to use access region 3.

Figure 16:
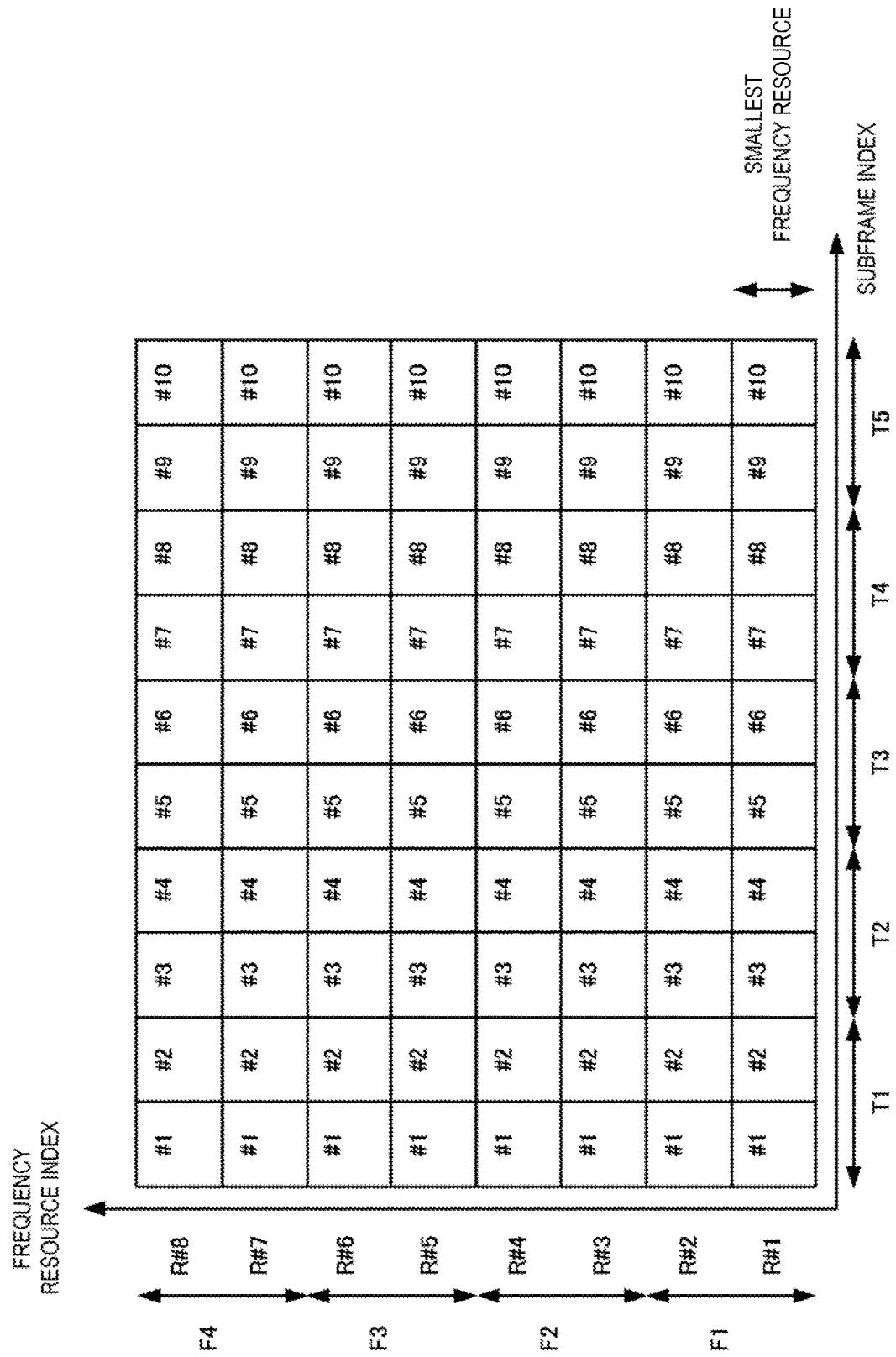
FIG. 16 is a diagram illustrating an example of the uplink frame structure according to the radio communication technique of the present embodiment.

FIG. 16 illustrates an example of an uplink frame structure according to the radio communication technique of the present embodiment. In FIG. 16, each access region is limited using frequency resources, and the smallest frequency resource (e.g., one or more resource blocks, resource block groups, or the like) is defined as an access region. In this example, F1 to F4 are defined as access regions, and an access region(s) usable in the contention-based radio communication technique is specified using configuration control information for each terminal apparatus. Note that the subframe sets described with reference to FIG. 15A and FIG. 15B may be used simultaneously. For example, consecutive subframe sets are configured as T1 to T5, and 20 combinations of F1 to F4 and T1 to T5 are configured as access regions, which may be defined according to frequency and time. In a case that a usable access region(s) is specified for a terminal apparatus, the number of access regions may be limited to one or may be multiple.

Data transmission is not necessarily needed for the terminal apparatuses accommodated by the base station apparatus. In view of this, in the preset embodiment, in the contention-based radio communication technique, the base station apparatus performs, for each terminal apparatus, notification of transmission suspension (deactivation, a state of not being capable of data transmission in the contention-based radio communication technique) in addition to transmission permission (activation, a state of being capable of data transmission in the contention-based radio communication technique) in the access region. This reduces the number of terminal apparatuses activated in each access region, it is possible for the base station apparatus to reduce, the probability of data transmission collision to be occurred probabilistically, which enables improvement of communication quality. In a case of frequently iterating switching of activation and deactivation, the amount of control information increases by transmitting control information for every switching. The base station apparatus may notify the cycle of activation and deactivation, notify the subframe sets for activation and deactivation, notify the subframe sets for activation and deactivation, for every frequency resource, or the like, in configuration control information. Activation, deactivation and hopping of the orthogonal resource for the identification signal may be applied simultaneously.

Figure 17:
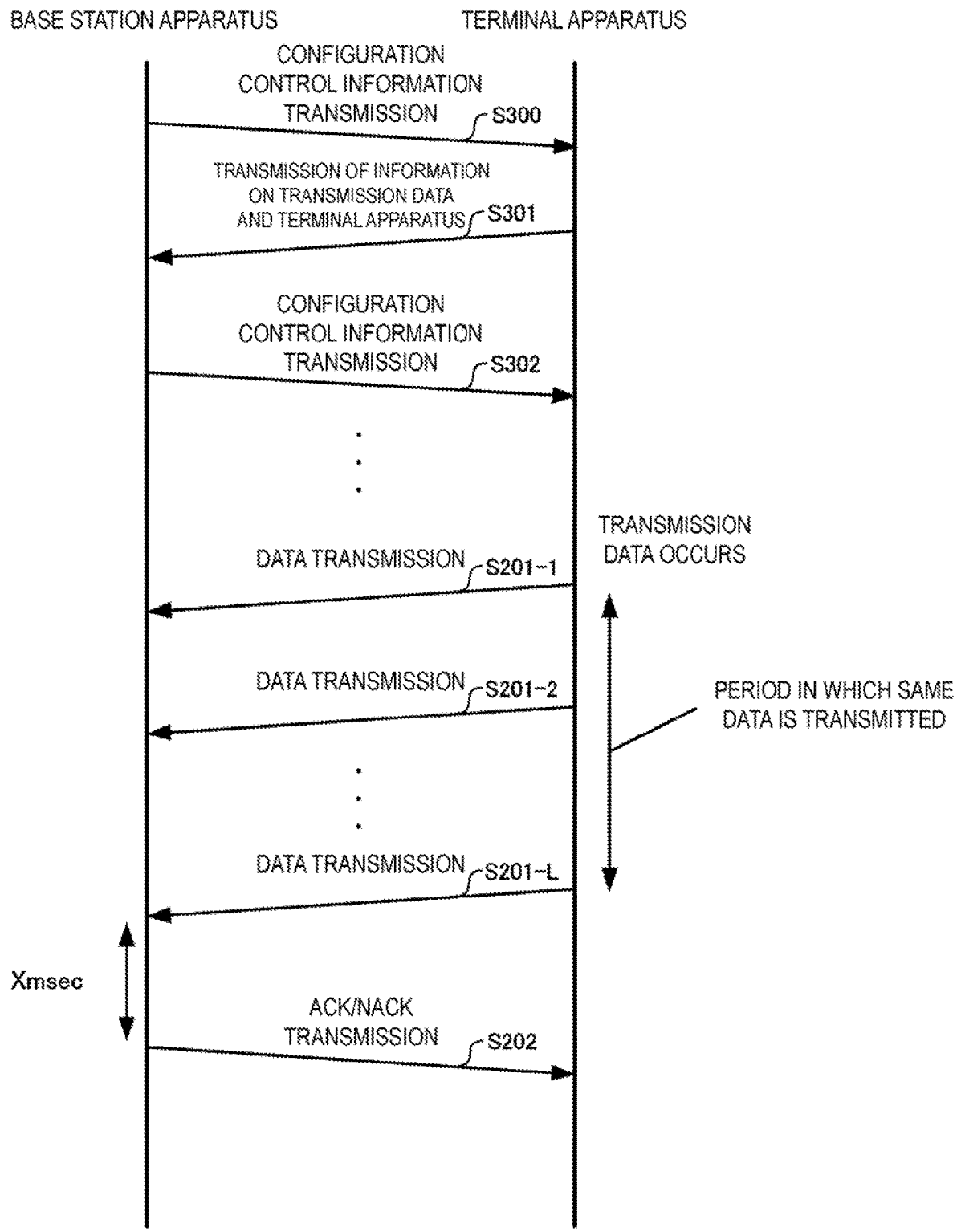
FIG. 17 is a diagram illustrating an example of a sequence chart of data transmission by the terminal apparatus according to the radio communication technique of the present embodiment.

The configuration control information transmitted from the base station apparatus in the present embodiment will be described. The configuration control information is transmitted in advance as in S200 in FIG. 3. This configuration control information may include, not only information indicating the orthogonal resource for transmitting identification information, the frequency resource (frequency position, bandwidth) to be used for data transmission, Modulation and Coding Scheme (MCS), the number of transmissions in a case of performing data transmission multiple times, whether or not HARQ is applied, a control value for the closed-loop of transmission power control, cell-specific and terminal-apparatus-specific target reception, a parameter for fractional transmit power control, whether or not DMRS is transmitted in a data transmission subframe (subframe for UL transmission in FIG. 5). CS pattern α and OCC pattern [w(0), w(1)] of DMRS in a case of transmitting DMRS in the data transmission subframe, whether or not CSI is transmitted, whether or not SRS is transmitted, and/or the like. Note that the base station apparatus may transmit configuration control information according to the state, capability, and/or QoS of the terminal apparatus. An example of a sequence chart of data transmission in this case is illustrated in FIG. 17. In FIG. 17, the base station apparatus transmits configuration control information that does not change according to the state, capability, and/or QoS of the terminal apparatus (S300). For example, such configuration control information indicates whether or not CSI is transmitted, whether or not DMRS is transmitted in a data transmission subframe, whether or not SRS is transmitted, or the like. Next, the terminal apparatus transmits transmission data and information on the terminal apparatus (S301). For example, the data size and data rate of the data to be transmitted from the terminal apparatus, transmission quality (required packet error rate), a packet loss value, and the like are transmitted. After the reception of the transmission data and the information on the terminal apparatus from the terminal apparatus, the base station apparatus transmits configuration control information according to the state, capability, and/or QoS of the terminal apparatus (S302). For example, the configuration control information includes a frequency resource (frequency position, bandwidth), MCS, cell-specific and terminal-apparatus-specific target reception, and the like. Moreover, in a case that the terminal apparatus may also include multiple transmit antennas, the number of transmission layers (ranks), the MCS for each layer (or for each codeword), and precoding information. Processing from S201-1 to S202 in FIG. 3 are similar to processing in FIG. 3, and thus transmission thereof is omitted.

In the present embodiment, an example of FDD has been described. However, this is also applicable to TDD. Note that whether the terminal apparatus may perform the same data transmission multiple times, and the number of transmissions may be notified as QoS from the terminal apparatus or may be determined by the base station apparatus for each cell.

As described above, in the present embodiment, a DMRS and an identification signal are shared in the contention-based radio communication technique, which enables improvement of the frequency efficiency. Moreover, by the base station apparatus specifying an access region for each terminal apparatus, it is possible to reduce the probability of data transmission collision, which enables improvement of communication quality. As a result of this, improvement of the reception quality and improvement of the frequency efficiency of the entire system are possible, and hence a number of terminals can be efficiently accommodated.

Second Embodiment

In a second embodiment of the present invention, an example in which an identification signal indicating whether or not there is transmission data is transmitted, instead of an identification signal for a transmission terminal apparatus, will be described.

In the present embodiment, a configuration example of a terminal apparatus is as illustrated in FIGS. 6, 7, 8, and 9 as in the first embodiment, and a configuration example of a base station apparatus is as illustrated in FIGS. 10, 11, and 12 as in the first embodiment. A sequence chart of data transmission of the terminal apparatus is as in the first embodiment, as illustrated in FIG. 3 or 17. Hence, a description is only given of different processing in the present embodiment, and a description of similar processing is omitted.

An identification signal is used not for identification of a transmission terminal apparatus but for identification of transmission data (whether or not there is transmission data or identification of presence of transmission data) in the present embodiment, and thus transmission of the identification signal is performed using the frame structure in FIG. 5. In the present embodiment, in the terminal apparatus, the identification signal multiplexing unit 106 and the identification signal generation unit 115 in FIG. 6 perform generation and multiplexing of the identification signal for identification of data transmission, instead of identification of a transmission terminal apparatus. Here, the identification signal multiplexing unit 106 and the identification signal generation unit 115 select an orthogonal resource for an identification signal. In a method of selecting an orthogonal resource for an identification signal, an orthogonal resource may be randomly selected by the terminal apparatus. Regarding a candidate for an orthogonal resource for an identification signal, multiple candidates may be notified in configuration control information by the base station apparatus in a terminal-apparatus-specific manner, multiple candidates may be notified through transmission of broadcast information (broadcasting) by the base station apparatus, or the candidate for the orthogonal resource may be predetermined by the terminal apparatus and the base station apparatus. The terminal apparatus may be notified of an orthogonal resource candidate by a base station apparatus different from a data transmission destination base station apparatus. Moreover, the terminal apparatus may receive, from a base station apparatus different from the data transmission destination base station apparatus, information on a base station apparatus capable of a contention-based radio communication technique, for example, information such as a cell ID, a usable frequency or bandwidth, or an orthogonal resource of an identification signal, and use the contention-based radio communication technique at the time when detection of a synchronization signal, broadcast information, or the like of a base station apparatus capable of using the contention-based radio communication technique is enabled.

In the present embodiment, the base station apparatus performs, in the identification signal separators 203-1 to 203-N and the transmission terminal identification unit 211 in FIG. 10, separation and detection of an identification signal for identification that data has been received, instead of identification of a transmission terminal apparatus. A transmission terminal apparatus cannot be uniquely identified even in a case that an identification signal is detected, and thus identification information on a transmission terminal apparatus is included in a data transmission subframe (UL transmission subframe). In a case of selecting a contention-based radio communication technique in the traffic management unit 114 in FIG. 6, the terminal apparatus includes an identifier of the terminal apparatus, in a data bit sequence. The identifier may be C-RNTI, may be assigned in advance using configuration control information, or may be another terminal-apparatus-specific information. In a case that terminal-apparatus-specific identification information is included in a data signal, the base station apparatus checks that there is no error bit through CRC in the decoding units 2065-1 to 2065-U in FIG. 12, then acquires the identifier of a terminal apparatus included in the data bit sequence, and performs identification of the transmission terminal apparatus. The decoding units 2065-1 to 2065-U may input terminal-apparatus-specific identification information in the obtained information bit sequence, into the transmission terminal identification unit 211. In a case of transmitting control information, such as ACK/NACK to the transmission terminal apparatus, the information on the identified transmission terminal apparatus is output to the control information generation unit 208. Subsequent processing is similar to that in the first embodiment, and hence a description thereof is omitted.

A description will be given of another example of a method of identifying a transmission terminal apparatus according to the present embodiment. The base station apparatus identifies whether or not there is transmission data, by using an identification signal and then performs detection of a signal in the signal detection unit 206. The decoding units 2065-1 to 2065-U obtain a bit sequence after error correction decoding, then performs exclusive-OR operation on the CRC and C-RNTI, and then checks whether or not there is any error bit. Here, the C-RNTI is terminal-apparatus-specific information and the transmission terminal apparatus cannot be identified based on an identification signal in the present embodiment, and thus the C-RNTI to be used cannot be identified. In view of this, the decoding units 2065-1 to 2065-U hold information (C-RNTI) on a terminal apparatus having possibility of performing data transmission in the contention-based radio communication technique and check whether or not there is any error bit in a result of an exclusive-OR operation of each of all the held C-RNTI and the CRC. In other words, the base station apparatus can identify the terminal apparatus using the C-RNTI for which no existence of any error bit is confirmed through CRC, as the terminal apparatus that has transmitted the data.

In the above-described way, the base station apparatus need not make notification of the orthogonal resource of the identification signal to be used by the terminal apparatus for data transmission through configuration control information. Meanwhile, the terminal apparatus may use any orthogonal resource. In the present embodiment, control information relating to another data transmission may be transmitted by transmission of broadcast information (broadcasting), and in this case, transmission of configuration control information in S200 in the sequence chart in FIG. 3 need not transmit terminal-specific control information but may use a broadcast channel. This means that, in a case of making notification of an orthogonal resource of identification information as broadcast information, any terminal apparatus capable of receiving the broadcast information uses the notified orthogonal resource of the identification signal and that the orthogonal resource can be shared and used by a number of terminal apparatuses.

In this case, the terminal apparatus that has acquired an identifier at the time of first establishment of a connection with a base station apparatus can discover the base station apparatus, based on a synchronization signal or a reference signal of the base station apparatus, and perform, after reception of broadcast channel information, data transmission (contention-based radio communication technique) without transmission and/or reception of terminal-apparatus-specific control information. Acquisition of the identifier may not be performed by the base station apparatus to perform data transmission. For example, in a case that there exist a macro base station apparatus with a large coverage and a small base station apparatus with a small coverage, it is possible for the terminal apparatus to acquire an identifier at the time of establishment of a connection with the macro base station apparatus and to perform data transmission or the like without transmission and/or reception of terminal-apparatus-specific control information after entering the coverage of the small base station apparatus.

However, each terminal apparatus selects an orthogonal resource freely and further the base station apparatus is not able to acquire the number of terminal apparatuses having a high possibility of using a contention-based radio communication technique, and thus it is unsuitable for a terminal apparatus necessary to perform highly reliable data transmission. To address this issue, the base station apparatus may transmit, as configuration control information, at least one of a frequency resource for allocation of an orthogonal resource or data transmission, the orthogonal resource being different from an orthogonal resource of the identification signal notified using a broadcast channel, and a subframe, to the terminal apparatus necessary to have high reliability. Hence, in a case that the terminal apparatus necessary to have high reliability is to use a contention-based radio communication technique, the terminal apparatus transmits a request for configuration control information in advance; in contrast, a terminal apparatus not required to have high reliability performs data transmission based on information of a broadcast channel without transmitting any request for configuration control information. Each terminal apparatus may select whether to use the orthogonal resource of the identification signal notified using the broadcast channel or the orthogonal resource of the identification signal notified using the configuration control information, according to the reliability required for transmission data.

Note that the terminal apparatus may notify the base station apparatus of whether the terminal apparatus performs the same data transmission multiple times and the number of transmissions, as QoS or may be determined by the base station apparatus for each cell. The terminal apparatus may be notified in advance of an access region for which transmission is allowed as in the first embodiment, and the terminal apparatus may select an orthogonal resource for an identification signal in the access region for which transmission is allowed as in the present embodiment and transmit the identification signal and a data signal. Information on the access region for which transmission is allowed may be information on a time domain, such as information on a subframe set or an OFDM symbol, may be information on a frequency resource, or may be a resource defined by both time and frequency.

As described above, in the present embodiment, in the contention-based radio communication technique, a signal for identification of a transmission terminal apparatus is included in a data bit sequence, and the terminal apparatus can freely determine an orthogonal resource to be used for transmission of an identification signal of data transmission. Hence, in a case of acquiring an identifier in advance, by discovering a base station apparatus and receiving information on a broadcast channel, the terminal apparatus can perform data transmission without transmission and/or reception of terminal-apparatus-specific control information. Consequently, the amount of control information can be reduced, the improvement of the frequency efficiency of the entire system is possible, and a number of terminals can be efficiently accommodated.

Third Embodiment

In a third embodiment of the present invention, a description will be given of an example in which, in a case of performing transmission of the same data multiple times, an orthogonal resource of an identification signal is changed for each data transmission.

In the present embodiment, a configuration example of a terminal apparatus is as illustrated in FIGS. 6, 7, 8, and 9 as in the first embodiment, and a configuration example of a base station apparatus is as illustrated in FIGS. 10, 11, and 12 as in the first embodiment. A sequence chart of data transmission of the terminal apparatus is as in the first embodiment, as illustrated in FIG. 3 or 17. Hence, a description is only given of different processing in the present embodiment, and a description of similar processing is omitted.

The example of transmission of an identification signal and data according to the third embodiment is illustrated in FIG. 14, and transmission of the same data is performed multiple times. As a result, a prescribed quality required for uplink data transmission of each terminal apparatus is satisfied. Here, in the known LTE and the like, each of all the terminal apparatuses performs retransmission of data after a prescribed time from data transmission. However, in a contention-based (Grant Free) radio communication technique, the situation in FIG. 18 occurs in a case that all terminal apparatuses have the same timing for first transmission and retransmission or the same timing for retransmission and retransmission. Here, in the present embodiment, the first data transmission is referred to as first transmission, and data transmission that is second or subsequent data transmission is referred to as retransmission. The terminal apparatus may not necessarily perform ACK/NACK reception between the performances of first transmission and retransmission. Although a description is given in the present embodiment by assuming repetitive transmissions of the same data, transmission is not limited to this example, and ACK/NACK reception may be performed for each data transmission. As in FIG. 18, in a case that terminal apparatuses 1 and 2 perform the first transmissions, which are first contention-based data transmissions, at the same timing after occurrences of data, data collision occurs every time the same data is transmitted in multiple transmissions. Basically, signal detection is possible even if data collision occurs. However, if data signals of extremely numerous terminals happen to collide, signal detection is difficult. By shifting transmission intervals of the terminal apparatuses as in FIG. 19, it is possible to reduce the probability of collision and to consequently improve communication quality. In the example in FIG. 19, the transmission cycle of the terminal apparatus 2 is assumed to be twice as long as that of the terminal apparatus 1. However, instead of using such integral multiple, the probability of collision may be reduced by selecting the transmission cycles having relatively prime numbers of subframes, or other numbers of subframes.

Figure 18:
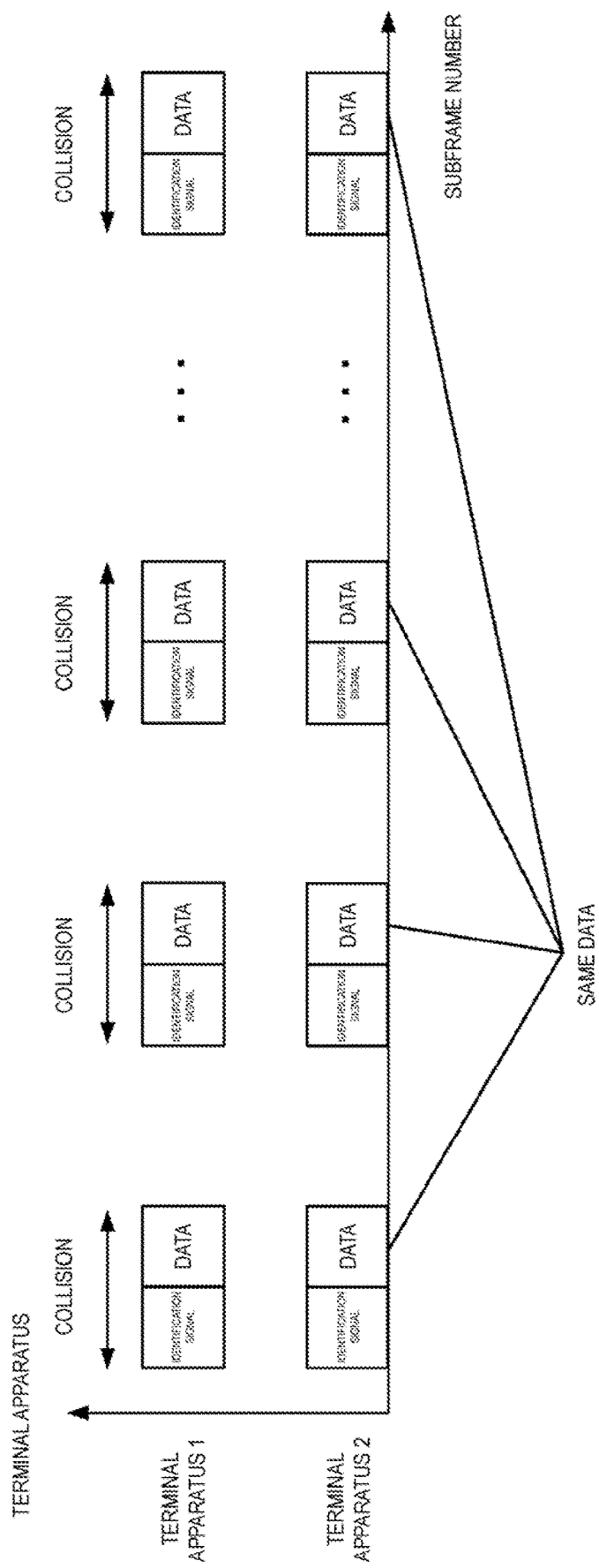
FIG. 18 is a diagram illustrating an example of data transmission from multiple terminal apparatuses according to the present embodiment.
Figure 19:
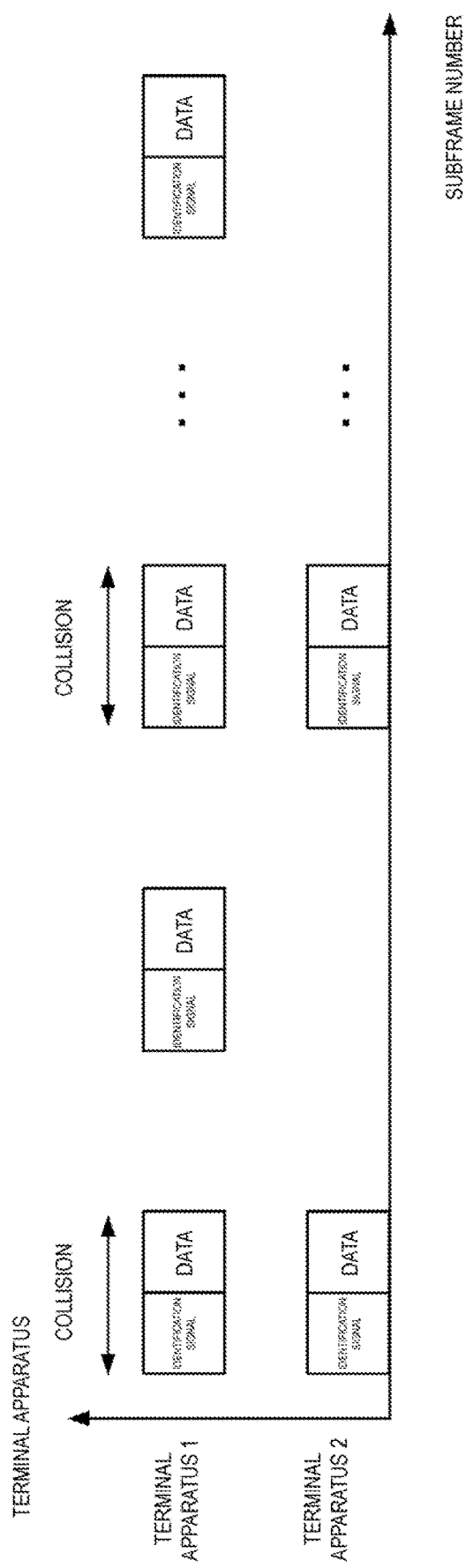
FIG. 19 is a diagram illustrating an example of a method of data transmission for the multiple terminal apparatuses, according to the present embodiment.

Next, in a case that collision occurs every time as in FIG. 18, it is important to increase the reception quality by receiving and composing data signals transmitted multiple times, and to achieve accurate identification of a transmission terminal based on an identification signal. However, in a case that the number of orthogonal resources of identification signals is smaller than the number of terminals accommodated by the base station apparatus, the orthogonal resources are allocated in an overlapping manner. In particular, in a case that terminal apparatuses for which data transmission collision occurs use the same orthogonal resource for the identification signals, identification of each transmission terminal apparatus is difficult. Hence, in a case that each terminal apparatus continues using a fixed orthogonal resource, collision occurs in all data transmissions as in FIG. 18, and each transmission terminal apparatus results in keeping on failing. This significantly deteriorates communication quality. In a case that each terminal apparatus performs data transmission multiple times, it is possible to improve the accuracy of transmission terminal identification by changing an orthogonal resource for the identification signal for each transmission. Specifically, configuration control information transmitted from the base station apparatus includes information uniquely indicating ($I_T$, $I_F$, $I_{OCC}$, $I_{CS}$, $I_{RF}$), and a hopping pattern in which the parameters ($I_T$, $I_F$, $I_{OCC}$, $I_{CS}$, $I_{RF}$) vary for each data transmission is also included as configuration control information. As a result, even if the orthogonal resources of the identification signals in first transmissions are the same, different orthogonal resources are used for retransmissions by hopping, and this prevents collision of the orthogonal resources from occurring all the time. The hopping may change at least one of or all the parameters ($I_T$, $I_F$, $I_{OCC}$, $I_{CS}$, $I_{RF}$). For example, in the case of performing hopping only on $I_T$, the terminal apparatus 1 maps the identification signal for each data transmission according to T1, T2, T3, . . . , and the terminal apparatus 2 maps the identification signal for each data transmission according to T1, T3, T5, . . . , for example. In a case of hopping a combination ($I_{OCC}$, $I_{CS}$, $I_{RF}$), it may be assumed that the ranges are $I_{OCC} \in \{0, 1\}$, $1 \leq I_{CS} \leq 12$, and $I_{RF} \in \{0, 1\}$, and the terminal apparatus 1 may perform such hopping as to (0, 1, 0), (1, 2, 1), (0, 3, 0), . . . for each data transmission, while the terminal apparatus 1 may perform such hopping as to (0, 1, 0), (0, 3, 1), (1, 5, 0) for each data transmission. Alternatively, instead of associating the number of times the same data is transmitted with a hopping pattern, the subframe number of each subframe of data transmission may be associated. In this case, an appropriate configuration is possible even in data transmission as that in FIG. 19. In a case of performing hopping by associating the subframe number of each subframe of data transmission and the orthogonal resource for an identification signal, the base station apparatus need not be informed of the number of times of data transmission from the terminal apparatus and can easily identify each transmission terminal apparatus, based on the orthogonal resource and the subframe number of the subframe in which the identification signal is detected.

The configuration control information transmitted from the base station apparatus in the present embodiment will be described. The configuration control information is transmitted in advance as in S200 in FIG. 3. Configuration control information includes information indicating orthogonal resources in which the identification signal is to be transmitted and a hopping pattern for orthogonal resources. Moreover, this configuration control information may include frequency resources (frequency position, bandwidth) to be used for data transmission, Modulation and Coding Scheme (MCS), the number of transmissions in a case of performing data transmission multiple times, whether or not HARQ is applied, a control value for the closed-loop of transmission power control, cell-specific and terminal-apparatus-specific target receptions, a parameter for fractional transmit power control, whether or not DMRS is transmitted in a data transmission subframe (subframe for UL transmission in FIG. 5), CS pattern α and OCC pattern [w(0), w(1)] of DMRS in a case of transmitting DMRS in the data transmission subframe, whether or not CSI is transmitted, whether or not SRS is transmitted, and/or the like. Note that the base station apparatus may transmit configuration control information according to the state, capability, and/or QoS of the terminal apparatus. An example of a sequence chart of data transmission in this case is illustrated in FIG. 17. In FIG. 17, the base station apparatus transmits configuration control information that does not change according to the state, capability, and/or QoS of the terminal apparatus (S300). For example, such configuration control information indicates whether or not CSI is transmitted, whether or not DMRS is transmitted in a data transmission subframe, whether or not SRS is transmitted, or the like. Next, the terminal apparatus transmits transmission data and information on the terminal apparatus (S301). For example, the data size and data rate of the data to be transmitted from the terminal apparatus, transmission quality (required packet error rate), a packet loss value, and the like are transmitted. After the reception of the transmission data and the information on the terminal apparatus from the terminal apparatus, the base station apparatus transmits configuration control information according to the state, capability, and/or QoS of the terminal apparatus (S302). For example, the configuration control information includes a frequency resource (frequency position, bandwidth), MCS, cell-specific and terminal-apparatus-specific target reception, and the like. Moreover, in a case that the terminal apparatus includes multiple transmit antennas, the number of transmission layers (ranks), the MCS for each layer, and precoding information may also be included.

In the present embodiment, an example of FDD has been described. However, this is also applicable to TDD. Note that, in a case of transmitting the same data multiple times, each data signal may be attached with a process number and transmitted to enable the base station apparatus to identify the data transmissions with the same data. Information of whether the terminal apparatus performs the same data transmission multiple times and the number of times of transmission may be notified as QoS from the terminal apparatus or may be determined by the base station apparatus for each cell.

In the present embodiment, as described above, the same data is transmitted multiple times in the contention-based radio communication technique to thereby reduce the probability of collision in multiple data transmissions and improve accuracy of detection of identification signals by hopping of orthogonal resources, for example. As a result of this, improvement of the reception quality and improvement of the frequency efficiency of the entire system are possible, and hence a number of terminals can be efficiently accommodated.

A program running on a device according to the present invention may serve as a program that controls a Central Processing Unit (CPU) and the like, and causes a computer to operate in such a manner as to realize the functions of the embodiments according to the present invention. Programs or the information handled by the programs are temporarily stored in a volatile memory, such as a Random Access Memory (RAM), a non-volatile memory, such as a flash memory, a Hard Disk Drive (HDD), or another storage device system.

Note that a program for implementing the functions of any of the embodiments relating to the present invention may be recorded on a computer readable recording medium. The functions may be implemented by causing a computer system to read and execute the program recorded on the recording medium. It is assumed that the "computer system" here refers to a computer system built into the devices, and the computer system includes an operating system and hardware components such as a peripheral device. Furthermore, the "computer-readable recording medium" may be any of a semiconductor recording medium, an optical recording medium, a magnetic recording medium, a medium dynamically holding a program for a short time, or another computer readable recording medium, or the like.

Furthermore, each functional block or various characteristics of the devices used in the above-described embodiments may be mounted or performed on an electric circuit, for example, an integrated circuit or multiple integrated circuits. An electric circuit designed to perform the functions described herein may include a general-purpose processor, a digital signal processor (DSP), an application specific integrated circuit (ASIC), a field programmable gate array (FPGA), or other programmable logical devices, discrete gates or transistor logic, discrete hardware components, or a combination thereof. The general-purpose processor may be a microprocessor, or may be a processor of known type, a controller, a micro-controller, or a state machine. The above-mentioned electric circuit may be constituted of a digital circuit, or may be constituted of an analog circuit. Furthermore, in a case that with advances in semiconductor technology, a circuit integration technology appears that replaces the present integrated circuits, it is also possible for the present invention to use an integrated circuit based on the technology.

Note that the invention of the present patent application is not limited to the above-described embodiments. In the embodiments, devices have been described as an example, but the invention of the present application is not limited to these devices, and is applicable to a terminal apparatus or a communication device of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in any of the embodiments is also included in the technical scope of the present invention.

The present international application claims priority based on JP 2016-083426 filed on Apr. 19, 2016, and the entire content of JP 2016-083426 is incorporated in the present international application by reference.

REFERENCE SIGNS LIST

10 Base station apparatus
20-1 to 20-Nm Terminal apparatus
101 Error correction coding unit
102 Modulating unit 103 Transmit signal generation unit
104 Signal multiplexing unit
105 IFFT unit
106 Identification signal multiplexing unit
107 Transmit power controller
108 Transmission processing unit
109 Transmit antenna
110 Receive antenna
111 Radio receiving unit
112 Control information detection unit
113 Transmission parameter storage unit
114 Traffic management unit
1030 Phase rotation unit
1031 DFT unit
1032 Signal assignment unit
1033 Phase rotation unit
1034 Interleaving unit
1041 Reference signal multiplexing unit
1042 Reference signal generation unit
1043 Control information multiplexing unit
1044 Control information generation unit
201-1 to 201-N Receive antenna
202-1 to 202-N Reception processing unit
203-1 to 203-N Identification signal separator
204-1 to 204-N FFT unit
205-1 to 205-N Signal separator
206 Signal detection unit
207 Channel estimation unit
208 Control information generation unit
209 Control information transmitting unit
210 Transmit antenna
211 Transmission terminal identification unit
2051 Reference signal separator
2052 Control information separator
2053 Assignment signal extraction unit
2054 Control information detection unit
2061 Cancellation processing unit
2062 Equalization unit
2063-1 to 2063-U IDFT unit
2064-1 to 2064-U Demodulation unit
2065-1 to 2065-U Decoding unit
2066-1 to 2066-U Symbol replica generation unit
2067 Soft replica generation unit

The invention claimed is:

1. A terminal apparatus for transmitting a data signal to a base station apparatus, the terminal apparatus comprising:
transmission processing circuitry configured to perform first data signal transmission of transmitting the data signal without receiving downlink control information of transmission permission transmitted from the base station apparatus and perform second data signal transmission of receiving the downlink control information of the transmission permission and transmitting the data signal based on the downlink control information;
identification signal multiplexing circuitry configured to multiplex an identification signal to an orthogonal resource; and
control information receiving circuitry configured to receive in advance a transmission parameter relating to transmission of the data signal, wherein
the transmission processing circuitry is configured to transmit the identification signal with consecutive Orthogonal Frequency-Division Multiplexing (OFDM) symbols and a data signal in a case of repeatedly transmitting the same data signal, based on the transmission parameter.

2. The terminal apparatus according to claim 1, wherein, in a case that the transmission processing circuitry repeatedly transmits the same data signal, the orthogonal resource to which the identification signal is multiplexed, is selected to be an orthogonal resource different for each data signal transmission.

3. The terminal apparatus according to claim 1, wherein the orthogonal resource is configured by at least one element of an OFDM symbol, a subcarrier, an OCC sequence, a CS pattern, and an IFDMA pattern.

4. The terminal apparatus according to claim 1, wherein the transmission parameter relating to the data signal transmission includes a degree of reliability of the data signal transmission that the terminal apparatus is required to have or the number of times the same data signal is transmitted, the number of times being configured according to delay time.

5. The terminal apparatus according to claim 2, wherein the orthogonal resource to which the identification signal is multiplexed is determined based on the number of times the same data signal is transmitted.

6. The terminal apparatus according to claim 2, wherein the orthogonal resource to which the identification signal is multiplexed is determined based on a subframe number of a subframe in which the same data signal is transmitted.

7. A base station apparatus for receiving a data signal from each of multiple-terminal apparatuses, the base station apparatus comprising:
reception processing circuitry configured to perform first data signal reception of receiving the data signal transmitted without transmitting downlink control information of transmission permission and perform second data signal reception of transmitting the downlink control information of the transmission permission and receiving the data signal transmitted based on the downlink control information;
identification signal separator circuitry configured to separate, from an orthogonal resource, an identification signal received together with the data signal;
transmission terminal identification circuitry configured to identify, based on the identification signal, the terminal apparatus that has performed data signal transmission; and
control information transmitting circuitry configured to transmit in advance a transmission parameter to be used for the data signal transmission, wherein
the reception processing circuitry is configured to receive the identification signal with consecutive Orthogonal Frequency-Division Multiplexing (OFDM) symbols and a data signal in a case of receiving, in the first data signal reception, the same data signal repeatedly transmitted based on the transmission parameter.

8. The base station apparatus according to claim 7, wherein, in a case that the reception processing circuitry receives the same data signal repeatedly transmitted from the terminal apparatus, the transmission terminal identification circuitry identifies the terminal apparatus, based on the identification signal multiplexed to the orthogonal resource different for each data signal reception.

9. The base station apparatus according to claim 7, wherein ACK/NACK is transmitted in the second data signal reception while ACK/NACK is not transmitted in the first data signal reception.

10. The base station apparatus according to claim 7, comprising signal detection circuitry configured to detect the data signal transmitted from the terminal apparatus, wherein in the first data signal reception, ACK/NACK is transmitted within a prescribed time from a subframe in which the signal detection circuitry correctly receives the data signal while the same data signal repeatedly transmitted is received.

11. A communication method for a terminal apparatus for transmitting a data signal to a base station apparatus, the communication method comprising:

performing first data signal transmission of transmitting the data signal without receiving downlink control information of transmission permission transmitted from the base station apparatus and performing second data signal transmission of receiving the downlink control information of the transmission permission and transmitting the data signal based on the downlink control information;

multiplexing an identification signal to an orthogonal resource;

receiving in advance a transmission parameter relating to transmission of the data signal; and transmitting the identification signal with consecutive Orthogonal Frequency-Division Multiplexing (OFDM) symbols and a data signal in a case of repeatedly transmitting the same data signal, based on the transmission parameter.

12. A communication method for a base station apparatus for receiving a data signal from each of multiple terminal apparatuses, the communication method comprising:

performing first data signal reception of receiving the data signal transmitted without transmitting downlink control information of transmission permission and performing second data signal reception of transmitting the downlink control information of the transmission permission and receiving the data signal transmitted based on the downlink control information;

separating, from an orthogonal resource, an identification signal received together with the data signal;

identifying, based on the identification signal, the terminal apparatus that has performed data signal transmission;

transmitting in advance a transmission parameter to be used for the data signal transmission; and receiving the identification signal with consecutive Orthogonal Frequency-Division Multiplexing (OFDM) symbols and a data signal in a case of receiving, in the first data signal reception, the same data signal repeatedly transmitted based on the transmission parameter.

* * * * *